(12) United States Patent
Rhodes et al.

(10) Patent No.: US 12,266,112 B2
(45) Date of Patent: Apr. 1, 2025

(54) INSTANT MASKS WITH POLARIZED LIGHT

(71) Applicant: Adobe Inc., San Jose, CA (US)

(72) Inventors: Tenell Rhodes, San Jose, CA (US); Brian Price, Pleasant Grove, UT (US); Gavin Stuart Peter Miller, Los Altos, CA (US); Kenji Enomoto, Osaka (JP)

(73) Assignee: Adobe Inc., San Jose, CA (US)

( * ) Notice: Subject to any disclaimer, the term of this patent is extended or adjusted under 35 U.S.C. 154(b) by 556 days.

(21) Appl. No.: 17/536,384

(22) Filed: Nov. 29, 2021

(65) Prior Publication Data

US 2023/0169658 A1   Jun. 1, 2023

(51) Int. Cl.
*G06T 7/11* (2017.01)
*H04N 5/272* (2006.01)

(52) U.S. Cl.
CPC .............. *G06T 7/11* (2017.01); *H04N 5/272* (2013.01); *G06T 2207/10024* (2013.01); *G06T 2207/10028* (2013.01)

(58) Field of Classification Search
CPC . G06T 7/11; G06T 7/194; G06T 2207/10024; G06T 2207/10028; G06T 2207/20081; G06T 7/174; H04N 5/272; H04N 5/275; H04N 23/56
See application file for complete search history.

(56) References Cited

U.S. PATENT DOCUMENTS

| | | | |
|---|---|---|---|
| 7,420,590 B2 * | 9/2008 | Matusik | H04N 5/272 382/300 |
| 7,609,327 B2 * | 10/2009 | Matusik | H04N 5/272 348/586 |
| 11,797,863 B2 * | 10/2023 | Venkataraman | G06T 19/20 |
| 2018/0253865 A1 * | 9/2018 | Price | G06N 3/084 |
| 2022/0247901 A1 * | 8/2022 | Asanoi | H04N 23/55 |

OTHER PUBLICATIONS

McGuire, Morgan et al., "Real-time Triangulation Matting using Passive Polarization," SIGGRAPH '06: ACM SIGGRAPH 2006 Sketches, Jul. 2006, 1 page.

* cited by examiner

*Primary Examiner* — Edward F Urban
*Assistant Examiner* — Michael Kim Maiden
(74) *Attorney, Agent, or Firm* — Nicholson De Vos Webster & Elliott LLP

(57) ABSTRACT

Embodiments are disclosed for generating an instant mask from polarized input images. A method of generating the mask includes obtaining, by a user interface manager, a set of polarized input images, the set of polarized images including background images depicting a background and subject images depicting a foreground object in front of the background and backlit by a polarized light source, the set of polarized input images including more than two polarized images, each associated with a different polarization angle, determining, by a matte optimization manager, an at least partially polarized reflection on the foreground object based on the set of polarized input images, determining, by the matte optimization manager, an alpha matte based at least on intensity values associated with each of the set of polarized input images such that the alpha matte isolates the foreground object and removes the at least partially polarized reflection, and generating, by a matte generator, an output matte based on the alpha matte.

20 Claims, 16 Drawing Sheets
(2 of 16 Drawing Sheet(s) Filed in Color)

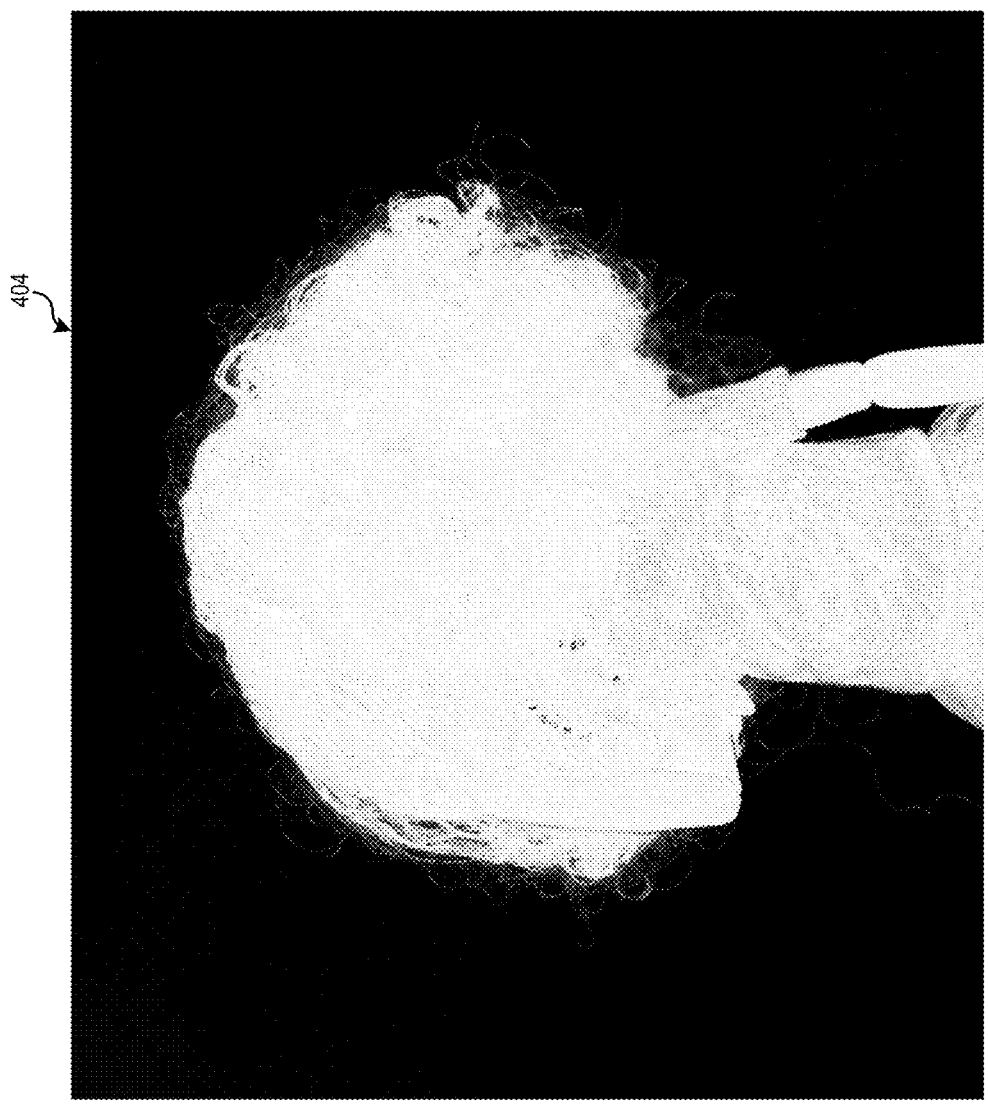
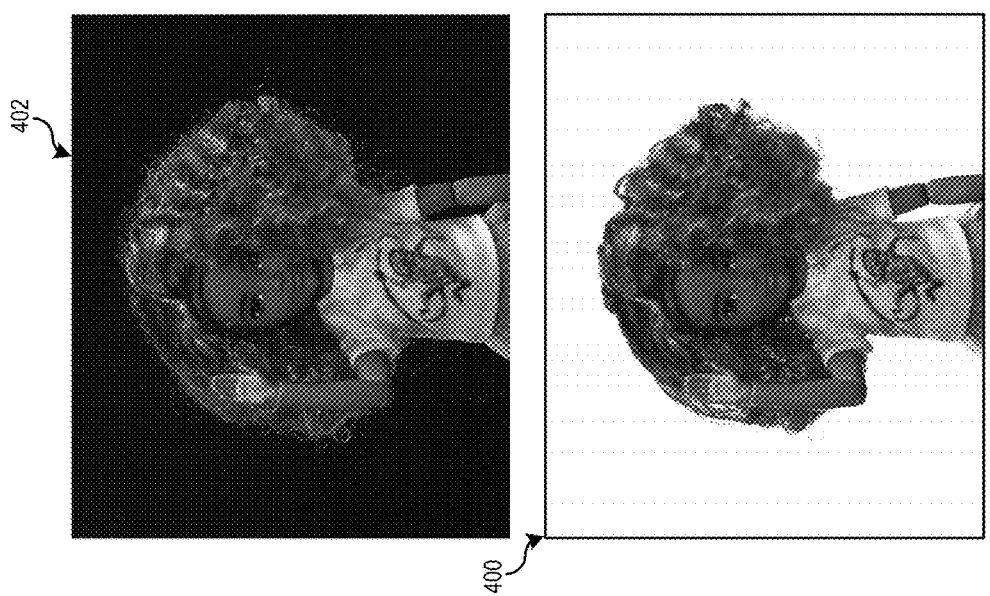
FIG. 4

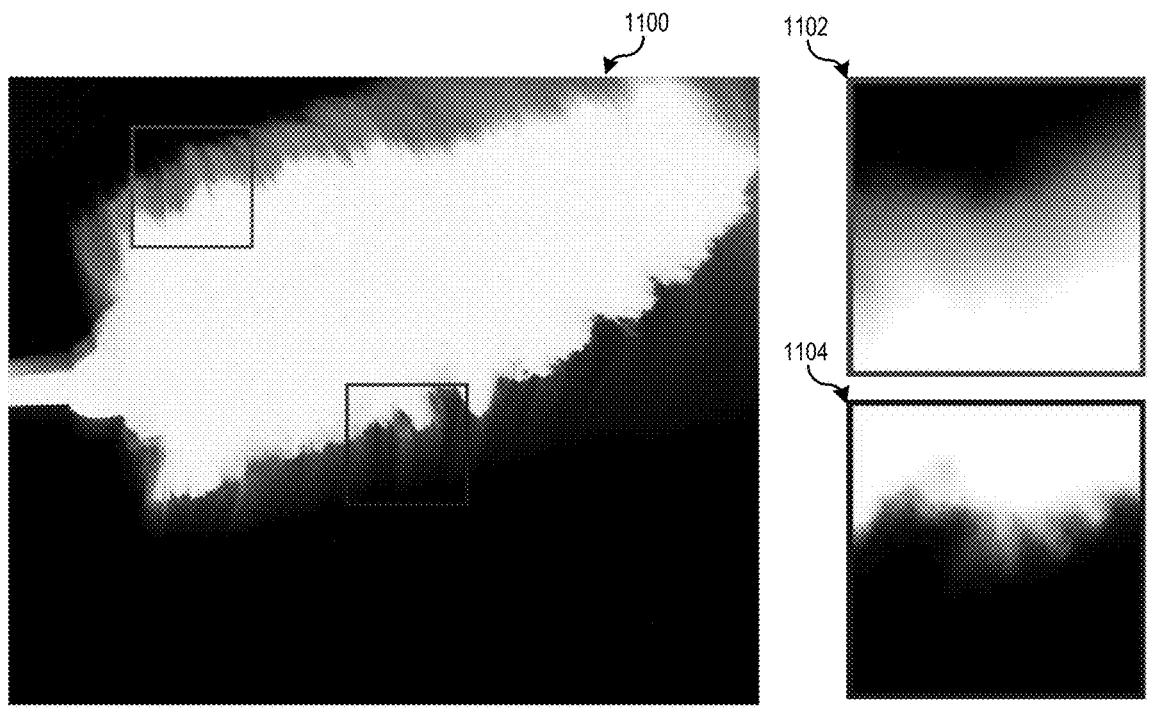
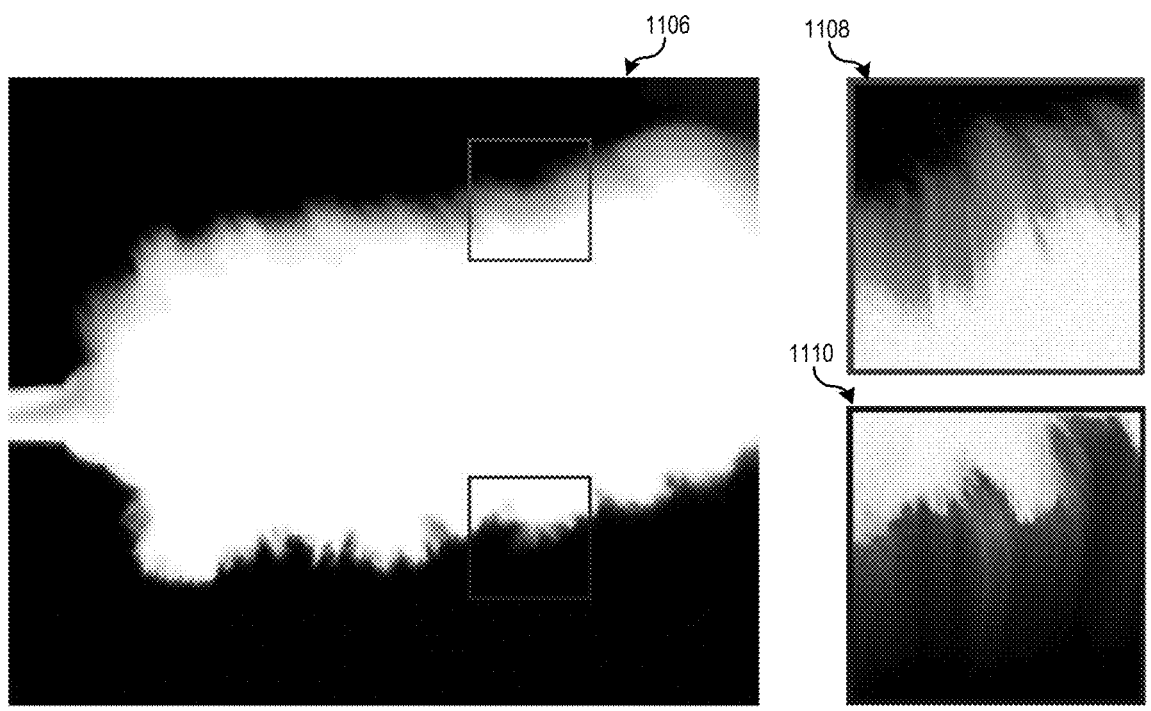
FIG. 11

1400

OBTAINING, BY A USER INTERFACE MANAGER, A SET OF POLARIZED INPUT IMAGES, THE SET OF POLARIZED INPUT IMAGES INCLUDING BACKGROUND IMAGES DEPICTING A BACKGROUND AND SUBJECT IMAGES DEPICTING A FOREGROUND OBJECT IN FRONT OF THE BACKGROUND AND BACKLIT BY A POLARIZED LIGHT SOURCE, THE SET OF POLARIZED INPUT IMAGES INCLUDING MORE THAN TWO POLARIZED IMAGES, EACH ASSOCIATED WITH A DIFFERENT POLARIZATION ANGLE 1402

DETERMINING, BY A MATTE OPTIMIZATION MANAGER, AN AT LEAST PARTIALLY POLARIZED REFLECTION ON THE FOREGROUND OBJECT BASED ON THE SET OF POLARIZED INPUT IMAGES 1404

DETERMINING, BY THE MATTE OPTIMIZATION MANAGER, AN ALPHA MATTE BASED AT LEAST ON INTENSITY VALUES ASSOCIATED WITH EACH OF THE SET OF POLARIZED INPUT IMAGES SUCH THAT THE ALPHA MATTE ISOLATES THE FOREGROUND OBJECT AND REMOVES THE AT LEAST PARTIALLY POLARIZED REFLECTION 1406

GENERATING, BY A MATTE GENERATOR, AN OUTPUT MATTE BASED ON THE ALPHA MATTE 1408

*FIG. 14*

INSTANT MASKS WITH POLARIZED LIGHT

BACKGROUND

With advances in digital imaging systems, using matting techniques to create novel composites or to facilitate other editing tasks has gained increasing interests, from both professionals as well as consumers. Matting refers to the problem of accurate foreground extraction from images and video. Alpha matting is a popular image processing technique used to determine how much of the foreground or background contributes to each pixel. Image and video editing applications rely on this technique to apply visual effects independently of these regions.

There are many green-screen and learning-based methods that achieve acceptable alpha masks. However, these techniques struggle with fine structures (e.g., hair, fur, meshes, etc.), semi-transparent objects, and optical and motion blur. This results in details of the foreground objects being lost when performing alpha matting, leading to inaccurate masks, visual artifacts, etc.

These and other problems exist with regard to generating masks in electronic systems.

SUMMARY

Introduced here are techniques/technologies that generate a highly accurate matte (also referred to herein as a mask) that does not require additional post processing using a set of polarized images. For example, a polarization camera includes polarization filters integrated with the sensor of the camera such that multiple polarized images are captured simultaneously. Each image has a different polarization angle. For example, in some embodiments, four images are captured having 0°, 45°, 90°, and 135° polarization angles. When a subject is backlit by a polarized light source, the backgrounds of the polarized images vary depending on the angle of polarization. For example, the polarized image that is aligned with the light source has the brightest background, while the polarized image that is orthogonal to the light source has the darkest background, and the other polarized images have backgrounds with a brightness in between, dependent on their polarization angles.

An inversion of the difference between the brightest and darkest polarized images yields a highly accurate mask. However, this alone does not account for reflection artifacts caused by polarized reflections off the subject in the foreground of the images. For example, because the subject is backlit, most foreground light reflected off the subject is unpolarized (e.g., originating from ambient light sources). However, depending on the material, the reflectivity, etc. of the subject, some of the unpolarized light, when reflected off the subject, becomes polarized or partially polarized. By using four polarized images with different orientations, these polarized reflections are modeled using a system of equations. A number of constraints are applied to the system, and it is optimized to solve for an alpha matte. Additionally, in some embodiments, to ensure that the constraints are true, intensity correction is applied to the polarized images to ensure that the combined intensity of orthogonal pairs of images are equal. By using the corrected polarized images to solve for the alpha matte, a highly accurate mask is generated for both simple and complex scenes that is able to capture fine detail and motion.

Additional features and advantages of exemplary embodiments of the present disclosure will be set forth in the description which follows, and in part will be obvious from the description, or are learned by the practice of such exemplary embodiments.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying drawings in which:

FIGS. 2-4 illustrate examples of artifacts generated by prior matte generation techniques;

FIGS. 10-11 illustrate examples of comparisons of optimized mattes to mattes generated by prior matte generation techniques, in accordance with one or more embodiments;

FIG. 14 illustrates a flowchart of a series of acts in a method of matte generation in accordance with one or more embodiments;

DETAILED DESCRIPTION

Figure 1:
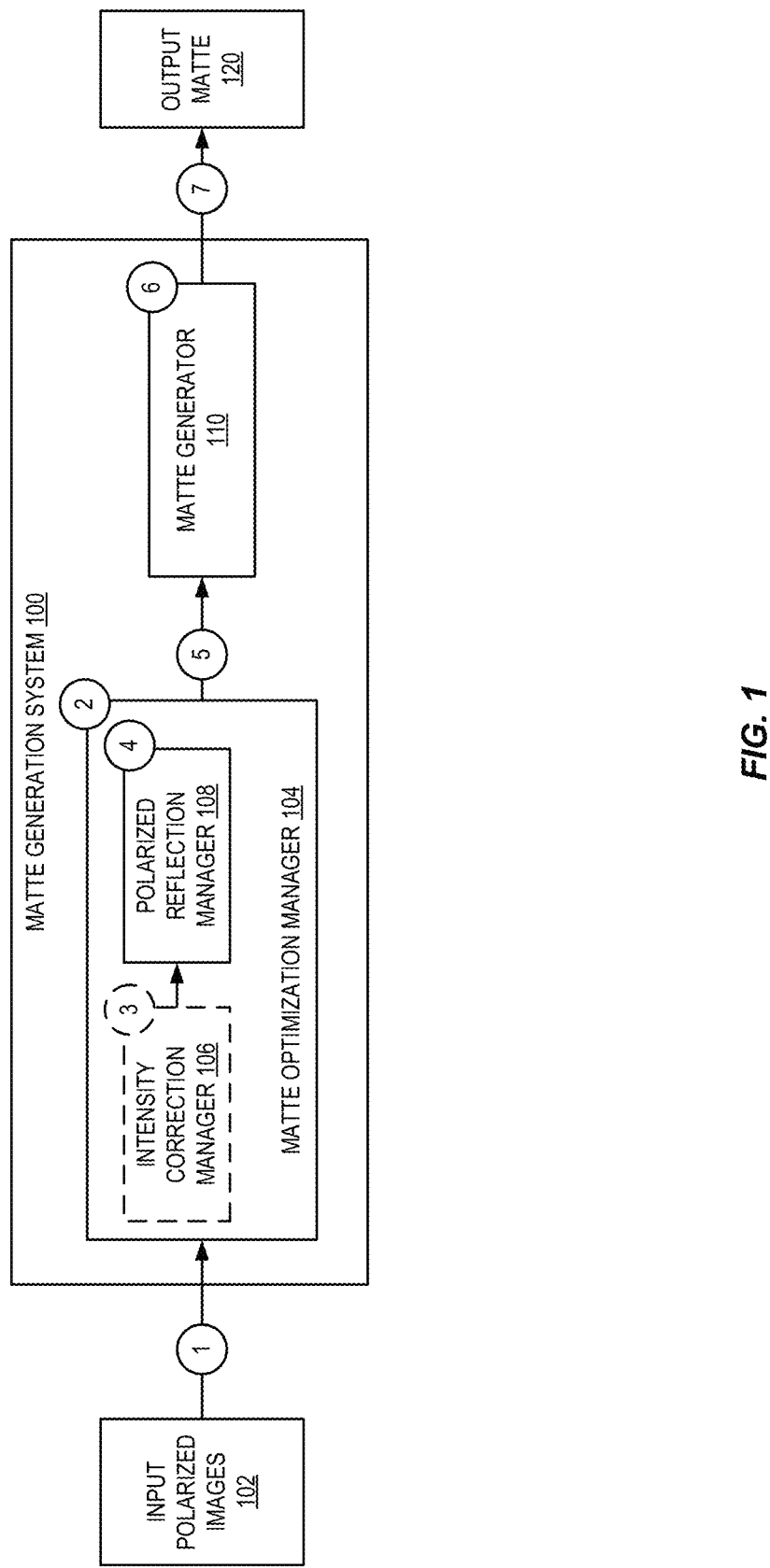
FIG. 1 illustrates a diagram of a process of matte generation using polarized light in accordance with one or more embodiments.

One or more embodiments of the present disclosure include a matte generation system that uses polarized input images (e.g., digital images, frames of a digital video, etc.) to generate an optimized matte that captures fine details of foreground objects. The optimized matte is usable in image or video editing to isolate the foreground objects, enabling the user perform compositing, apply various image and/or video effects, etc. A polarized light source, such as a polarized screen, is positioned behind an object of interest. Polarized images are then captured of the object of interest where light from the background is polarized and light reflected from the object is predominantly unpolarized. In some embodiments, the polarized images are captured using a specialized camera which includes on-sensor polarizing filters. For example, one such specialized camera includes a polarizing filter associated with each pixel, resulting in multiple polarized images each time an image is captured. The polarizing filter includes four orientations (0°, 45°, 90°, and 135°) resulting in four polarized images. Alternatively, in some embodiments, a plurality of beam splitters is used to obtain the input polarized images.

In such embodiments, the polarized images include one image with a bright background (e.g., the 90° image), one image with a dark background (e.g., the 0° image), and two images with grey or in between backgrounds (e.g., the 45° and 135° images). Because most of the light reflected from the foreground object is unpolarized, the object appears roughly the same in each image (e.g., it is not brighter or darker from one image to the next). Using these polarized images, embodiments produce highly accurate alpha mattes for finely detailed and varyingly transparent still or moving objects in images and video. Additionally, unlike mattes computed according to prior techniques which require significant manual correction, the mattes computed according to the embodiments described herein do not require manual post-production edits.

Prior techniques have utilized polarized images to construct mattes. For example, the dark background image is subtracted from the bright background image, and the result is inverted. However, the foreground object does not always reflect only unpolarized light. For example, it is possible for objects to partially polarize light that is incident upon the object, causing the object to reflect this partially polarized light. This typically occurs when the object is shiny and/or when the object is made of a material that makes the object more likely to polarize light (e.g., dielectric materials). This leads to visual artifacts due to the partially polarized reflections not being removed from the matte.

Embodiments address the shortcomings in the prior art by using more than two polarized input images. The prior art techniques relied on beam splitters to obtain two polarized images (e.g., a 0° image and a 90° image). With only two images, these techniques could only subtract the foreground object from the image to create a matte. By using more than two polarized images (e.g., 0°, 45°, 90°, and 135° images), embodiments are able to model the partially polarized reflections as a quadratic optimization problem. By solving the quadratic optimization, the foreground object and any polarized or partially polarized reflections are also removed, yielding a matte that captures fine details while also removing visual artifacts introduced by reflected polarized light. Additionally, embodiments perform intensity correction to prevent any further visual artifacts from being introduced by the optimization process. Intensity correction slightly modifies the intensity of the polarized images to ensure that an intensity equality constraint is met. This eliminates noise from areas of the matte that represent motion blur, thin films etc.

As a result, embodiments produce highly accurate alpha mattes for finely detailed and varyingly transparent still or moving objects in images and video that do not require additional post processing to be used (e.g., "instant" mattes). Additionally, when practiced using a polarized camera, embodiments provide a simple solution that does not require multiple beam splitters and pixel-perfect image alignment, making it easier to implement the system in practice. Further, by eliminating the need for post processing of the mattes, embodiments save substantial processing time and energy.

Embodiments are generally described with respect to digital images. However, as discussed further below, in some embodiments the digital images correspond to frames of digital videos. As such, embodiments are applicable to both image processing and video processing, and it should not be read as limited to either use case.

Term Definitions

As used herein, the term "image" or "digital image" refers to a digital graphics file that when rendered displays one or more objects. In particular, the term "image" comprises a digital file that, when rendered, includes visual representations of one or more objects, such as a person. For example, the term "digital image" includes, but is not limited to, digital files with the following file extensions: JPG, TIFF, BMP, PNG, RAW, or PDF. Thus, a digital image includes digital data or a digital file for an image that is displayable via a graphical user interface of a display of a computing device. In some embodiments, an image refers to a frame of a digital video.

As used herein, the term "digital video" refers to digital data representative of a sequence of visual images. In particular, a digital video includes a sequence of images with corresponding digital audio. For example, the term "digital video" includes, but is not limited to, digital files having one of the following file extensions: AVI, FLV, WMV, MOV, MP4. Similarly, as used herein, the term "frame" (or "frame of a digital video") refers to a digital image from a digital video.

As used herein, the term "polarized image" refers to an image which has been captured using a polarizing filter, such as beam splitters, polarization camera, or combinations thereof. The polarizing filter filters out incident light that is not aligned with the filter, resulting in only light of a specific polarization angle being transmitted to the image capture device.

As used herein, the term "alpha matte" (also referred to herein as "matte" or "mask") is a layer that defines the transparent/opaque areas of the background and the foreground layer. This determines how much of the foreground or background contributes to each pixel of an image, a sequence of images, frames of a video, etc. Each pixel of the alpha matte includes a value that ranges from fully opaque to fully transparent (e.g., values between 0 and 1, 0 and 255, or other values). This enables the alpha matte to be used to isolate the foreground subject from the background in images, videos, etc.

Referring now to the figures, FIG. 1 illustrates a diagram of a process of matte generation using polarized light in accordance with one or more embodiments. As shown in FIG. 1, in one or more embodiments, input polarized images 102 are received by matte generation system 100, as shown at numeral 1. For example, input polarized images 102 include digital files, frames of digital video, etc. as discussed above. Each polarized image is associated with a different polarization angle. For example, in some embodiments, input polarized images 102 include 0°, 45°, 90°, and 135° images. The polarized images include background images, which depict the background without any foreground objects, and subject images that depict a representation of one or more objects (e.g., a "subject") in front of the background. In some embodiments, the polarized images 102 are captured using a polarization camera. A polarization camera is an imaging device that includes a specialized sensor which enables the camera to simultaneously capture multiple images of different polarization states per color channel. One example of such a camera is the FLIR Blackfly S Polarization Camera which includes 0°, 45°, 90°, and 135° polarization filters on the sensor. In alternative embodiments, the polarized images 102 are captured using beam splitters or a combination of beam splitters and a polarization camera.

If a subject is captured by the polarization camera in front of an unpolarized backlight, the background of all four images appears to have the same intensity. However, as discussed further below, when a subject that is backlit by a polarized light source, such as a polarized screen or other polarized light source, the intensity of the background will vary depending on the polarization angle of the light source and the polarization angles of the polarization filters. For example, if the polarized light source is polarized at 90°, then the background of the image with the polarization filter that is aligned with the polarized light source (e.g., 90°) will be the brightest, while the background of the image with the polarization filter that is orthogonal to the light source (e.g., 0°) will be the darkest. The backgrounds of the other images (e.g., 45° and 135°) will be equal and will be approximately half the intensity of the brightest image. Because the light reflected off the subject is predominantly unpolarized, the intensity of the subject will appear roughly equal in each image.

As shown in FIG. 1, the input polarized images 102 are received by matte optimization manager 104. In some embodiments, the polarized images are received directly from the polarization camera that captured them. Alternatively, in some embodiments, the input polarized images 102 are obtained from an image data store or other storage location accessible to the matte generation system. As discussed, the polarized images include more than two polarized images (e.g., three or more polarized images), each having a different polarization angle. The polarized images include background polarization images, which only depict the background without any foreground objects and subject polarization images which depict a subject in front of the background. At numeral 2, the matte optimization manager 104 generates an optimized matte that accounts for polarized reflections and intensity correction. For example, the matte optimization manager 104 includes a polarized reflection manager 108 and an intensity correction manager 106.

In classic matting using polarized light (e.g., such as described in "Real-time Triangulation Matting using Passive Polarization," Morgan Mcguire et al. 2006), the composite equation is represented as $$I_\phi = \alpha F + (1-\alpha) B_\phi \quad (1)$$

where an image I with polarization angle, $\phi$, includes a foreground F multiplied by an alpha matte a combined with a background B multiplied by 1-$\alpha$. The alpha matte is obtainable using the subject polarization images with the brightest and darkest backgrounds (e.g., $I_{90}$ and $I_0$) and background polarization images (e.g., $B_{90}$ and $B_0$) using the following equation:

$$\alpha = 1 - \frac{I_{90} - I_0}{B_{90} - B_0} \quad (2)$$

Figure 2:
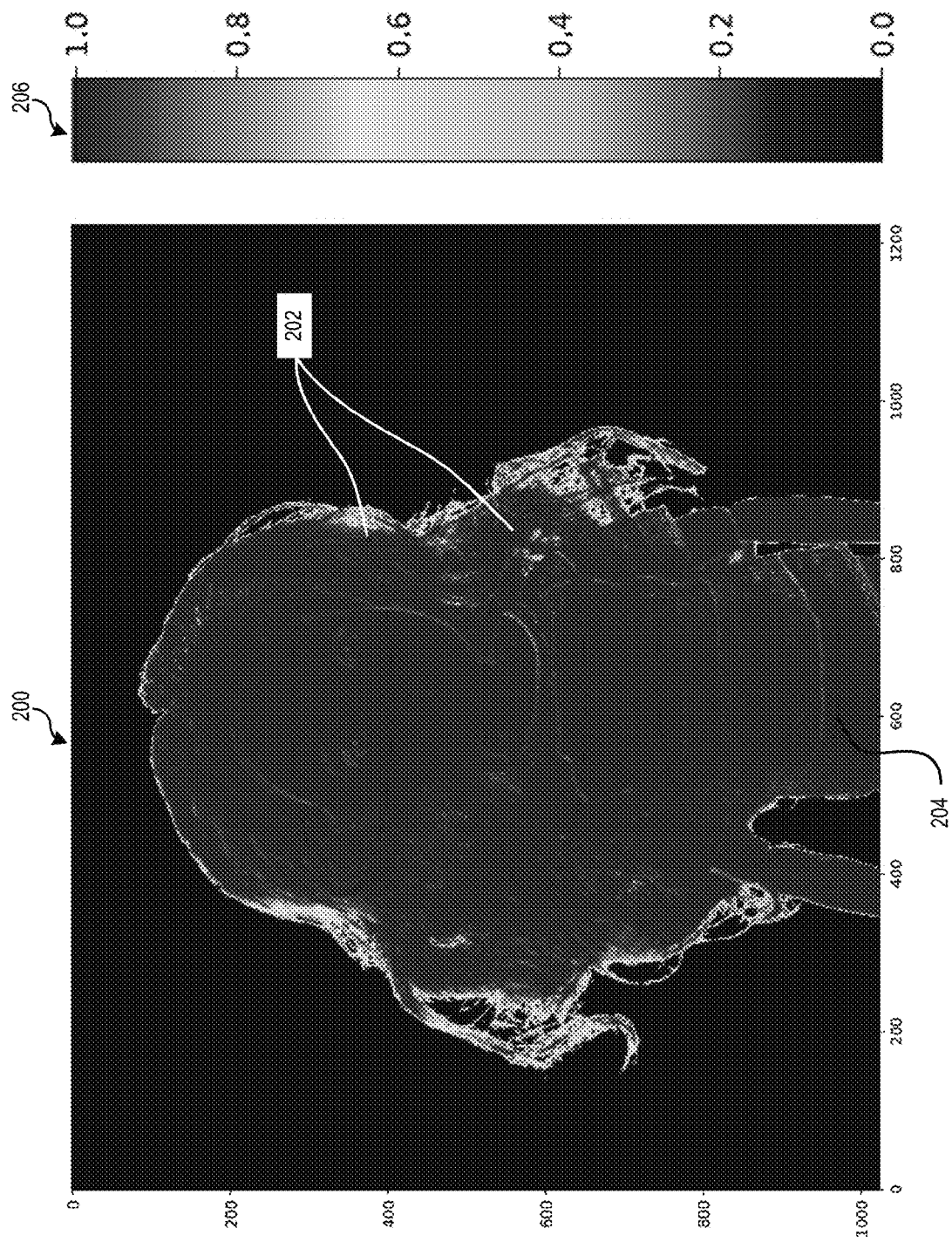
Figure 3:
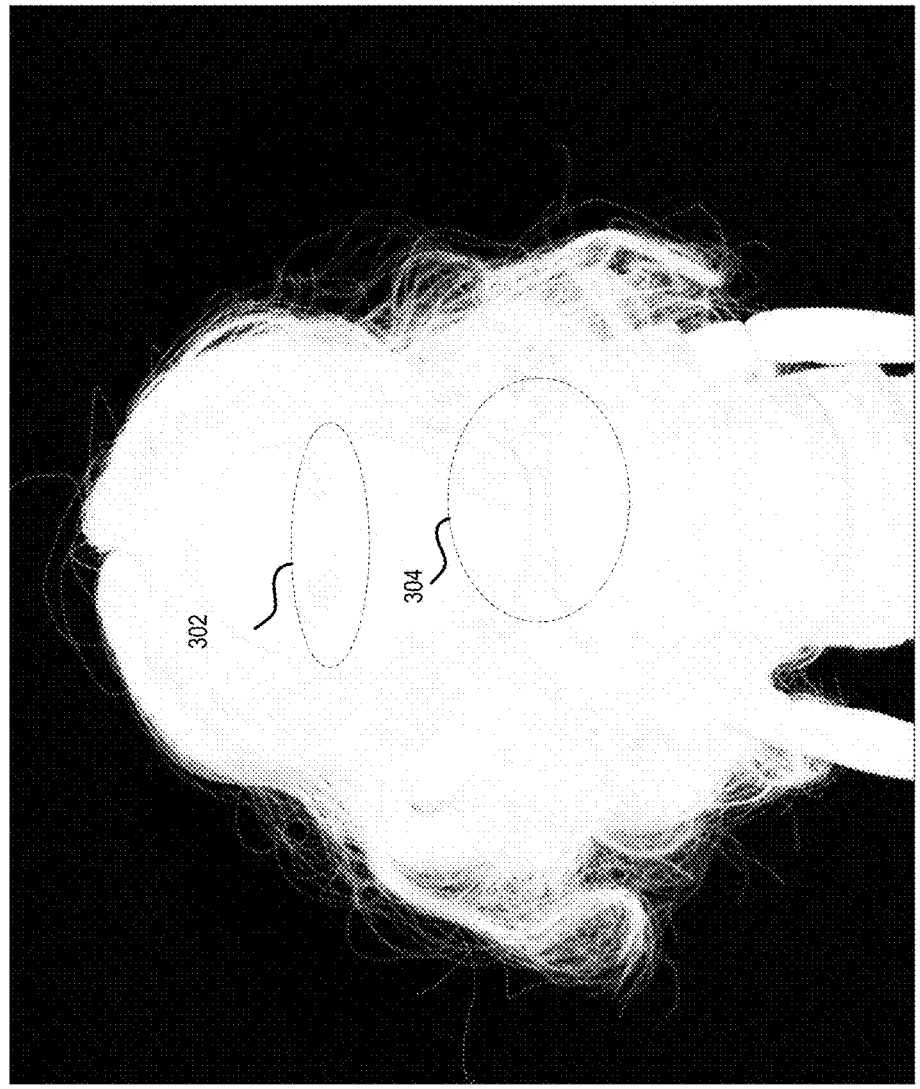

However, as discussed, this results in visual artifacts when polarized or partially polarized light is reflected from the object's surface. FIGS. 2-4 illustrate examples of artifacts generated by prior matte generation techniques. For example, as shown in FIG. 2, heat map 200 represents an alpha matte generated using prior techniques. As indicated by heat map 200, dark red areas are opaque while dark blue areas are transparent. Therefore, the resulting matte does not yield a perfectly solid subject, which results in some background being at least partially visible. For example, rather than resulting in solid areas of the subject (e.g., indicating that the areas are opaque), there are distortions shown in areas 202 and 204. Heat map 200 is colored to show the alpha values computed using equation 2, above (as shown in scale 206), to make the artifacts more visible. In this example, the scale varies from red, representing a value of 1 which corresponds to solid, to blue, representing a value of 0 which corresponds to transparent. Areas that are not dark red are at least translucent, allowing some of the background to contribute to the foreground pixels. These artifacts then result in a less accurate matte, as shown in FIG. 3.

When the alpha matte is converted into an output matte 300 (e.g., by inverting the alpha values), the artifacts are propagated through. In this example, the subject of the images is a doll. The eyes of the doll are clearly visible in the matte as shown at 302, along with details of the doll's clothes as shown at 304. These artifacts are areas that should be solid but are instead translucent. As such, a solid matte is not obtained which leads to distortions when used for effects or other applications of alpha mattes. FIG. 4 shows another example of a matte displaying significant artifacts. For example, given two polarized input images $I_{90}$ 400 and $I_0$ 402 (and background polarized images $B_{90}$ and $B_0$, not shown), resulting matte 404 is generated using prior matte generation techniques. As shown, a number of artifacts are clearly visible throughout the matte, including clothing details, facial features, hair details, etc. The resulting artifact areas of the matte are not fully opaque. As a result, when compositing the object (in this example, a doll) onto a new background using the matte, the artifact areas allow at least some of the background to show through. For example, if the object is composited against the sky, then the blue of the sky shows through the artifacts. Similarly, if the object is composited over a background that has motion, then portions of objects moving in the background may become visible through the artifacts because those areas are semi-transparent rather than opaque.

Returning to FIG. 1, a number of constraints are applied to the input polarized images by the matte optimization manager 104 to model the polarized reflections. One of these constraints requires that the intensity of $I_{90}$ and $I_0$ be equal to the sum of the intensities of $I_{45}$ and $I_{135}$. If this constraint does not hold, then additional artifacts can result in the output matte. Accordingly, at numeral 3, intensity correction is performed on the input polarized images 102 by intensity correction manager 106. In various embodiments, intensity correction is an optional step. For example, if the user selects an intensity correction option via a user interface, then intensity correction is performed. Otherwise, processing proceeds directly to polarized reflection manager 108. Additional details of the intensity correction process are described below. The polarized reflection manager 108 models the polarized or partially polarized reflections from the subject to obtain a more accurate matte using the polarized input images. For example, a composite equation that includes the polarized reflections is represented as $$I_\phi = \alpha(F + A\cos^2(\theta - \phi)) + (1-\alpha) B_\phi \quad (3)$$

where $A\cos^2(\theta - \phi)$ is a term that represents the polarized reflection from the foreground. "A" is the intensity of the polarized light that is reflecting off of the foreground object before it passes through the polarized filter. The cosine term determines how much of that reflected light passes through the filter and θ is the polarization angle of the reflected light. This term leverages the information from the backgrounds of the 45° and 135° polarized images to determine what polarized reflections are present in the images.

If $\alpha_c$ is the matte estimate based on equation (1), and $\alpha_e$ is the matte estimate based on equation (3), then $$\alpha_c = \alpha_e\left(1 + \frac{A\cos(2\theta)}{B_{90} - B_0}\right) \quad (4)$$

This means if 45°<θ<135°, $\alpha_c$ is less than 1 on foreground.

Equation 3 can then be transformed into the following linearly solvable composite equation with four unknowns:

$$I_\phi = \alpha(F + P_\phi) + (1-\alpha)B_\phi \quad (5)$$

where $P_\phi$ corresponds to $A\cos^2(\theta - \phi)$. A number of constraints are then applied to reduce the unknowns. For example, one constraint includes that $P_0 + P_{90} = P_{45} + P_{135}$. Additionally, if it assumed that $\min(P_0, P_{90}, P_{45}, P_{135}) = P_0$, then:

$$F \leftarrow F + P_0,$$

$$P_{45} \leftarrow P_{45} - P_0,$$

$$P_{90} \leftarrow P_{90} - P_0,$$

$$P_{135} \leftarrow P_{135} - P_0$$

This results in the following system of equations:

$$I_0 = \alpha F + (1-\alpha)B_0$$

$$I_{45} = \alpha(F + P_{45}) + (1-\alpha)B_{45}$$

$$I_{90} = \alpha(F + P_{90}) + (1-\alpha)B_{90}$$

$$I_{135} = \alpha(F + P_{135}) + (1-\alpha)B_{135}$$

When $\min(P_0, P_{90}, P_{45}, P_{135}) = P_0$ actually holds true, then the above system of equations account for polarized reflections. If, however, $\min(P_0, P_{90}, P_{45}, P_{135}) = P_{90}$ instead, then so long as $P_{45} = P_{90} = P_{135} = 0$, then the matte estimate is similar to one based on equation 1. To facilitate quadratic optimization, the above system of equations is transformed into the following system:

$$I_{45} - I_0 = \alpha P_{45} + (1-\alpha)(B_{45} - B_0)$$

$$I_{90} - I_0 = \alpha P_{90} + (1-\alpha)(B_{90} - B_0)$$

$$I_{135} - I_0 = \alpha P_{135} + (1-\alpha)(B_{135} - B_0)$$

Expressed in matrix form, this system of equations becomes:

$$\begin{bmatrix} (B_0 - B_{45}) & 1 & 0 & 0 \\ (B_0 - B_{90}) & 0 & 1 & 0 \\ (B_0 - B_{135}) & 0 & 0 & 1 \end{bmatrix} \begin{bmatrix} \alpha \\ \alpha P_{45} \\ \alpha P_{90} \\ \alpha P_{135} \end{bmatrix} = \begin{bmatrix} (I_{45} - B_{45}) - (I_0 - B_0) \\ (I_{90} - B_{90}) - (I_0 - B_0) \\ (I_{135} - B_{135}) - (I_0 - B_0) \end{bmatrix}$$

with the following constraints:

$$0 \leq \alpha \leq 1$$

$$0 \leq \alpha F \leq 1 \Rightarrow 0 \leq I_0 - (1-\alpha)B_0 \leq 1$$

$$0 \leq \alpha P_\phi \leq s\alpha F \text{(where } s \text{ is a constant} \approx 1\text{)}$$

$$P_{90} = P_{45} + P_{135}$$

It is assumed that the unpolarized light reflections off the subject are greater in intensity than the polarized light reflecting off the subject. To this end, the value of the parameter s is tunable to ensure this constraint holds. This additionally means that some subjects, such as mirrors or other shiny objects for which this assumption does not hold, are not capable of being optimized by this technique. This matrix equation is then used to define an objective for a quadratic optimization problem:

$$\min_{x \in \mathcal{W}} \|y - Dx\|_2^2$$

$$\mathcal{W} = \left\{ \begin{array}{l} x \mid 0 \leq \alpha \leq 1, 0 \leq I_0 - (1-\alpha)B_0 \leq 1 \\ 0 \leq \alpha P_\phi \leq s\alpha F, P_{90} = P_{45} + P_{135} \end{array} \right\}$$

where, $$D = \begin{bmatrix} (B_0 - B_{45}) & 1 & 0 & 0 \\ (B_0 - B_{90}) & 0 & 1 & 0 \\ (B_0 - B_{135}) & 0 & 0 & 1 \end{bmatrix}$$

$$x = \begin{bmatrix} \alpha \\ \alpha P_{45} \\ \alpha P_{90} \\ \alpha P_{135} \end{bmatrix}$$

$$y = \begin{bmatrix} (I_{45} - B_{45}) - (I_0 - B_0) \\ (I_{90} - B_{90}) - (I_0 - B_0) \\ (I_{135} - B_{135}) - (I_0 - B_0) \end{bmatrix}$$

Additionally, for grayscale images $x \in \mathbb{R}^4$, $y \in \mathbb{R}^3$, $D \in \mathbb{R}^{3 \times 4}$ and for RGB images $x \in \mathbb{R}^{10}$, $y \in \mathbb{R}^9$, $D \in \mathbb{R}^{9 \times 10}$.

In some embodiments, the polarized reflection manager 108 implements a quadratic optimization library, such as cvxopt, to solve the objective. At numeral 4, the polarized reflection manager 108 solves the quadratic optimization iteratively for each pixel of the images to solve for the unknown parameters (e.g., the alpha value of each pixel, among other parameters) that satisfy the objective. Using these alpha values, the output matte is generated.

As discussed above, polarized reflection manager 108 generates an optimized alpha matte that accounts for polarized or partially polarized reflections from the subject of a plurality of polarized input images. This is performed based on a number of constraints that assume particular characteristics of the images. However, if these constraints do not hold in practice, then this can lead to additional artifacts being introduced into the alpha matte. To account for these artifacts, intensity correction manager 106 performs intensity correction on the input polarized images prior to them being processed by the polarized reflection manager 108 to ensure that the intensity constraints on the images hold in practice.

As discussed, one of the constraints to solve for the optimized alpha matte is that $P_{90} = P_{45} + P_{135}$. However, this does not always hold in practice (e.g., $I_0 + I_{90} \neq I_{45} + I_{135}$). As such, in some embodiments, corrected images, $I'_\phi = c_\phi I_\phi$, are computed to ensure this assumption holds. In some embodiments, corrected images are computed by intensity correction manager 106 prior to determining an optimized alpha matte by polarized reflection manager 108. Alternatively, intensity correction manager 106 performs intensity correction only if it is determined that the optimized alpha matte has intensity-related noise that was introduced during the optimization process. In either case, at numeral 4 intensity correction manager performs intensity correction on the input polarized images 102.

To compute the corrected images, correction terms for each image are defined as $c=[c_0, c_{45}, c_{90}, c_{135}]^T$ and $m=[I_0, -I_{45}, I_{90}, -I_{135}]^T$ This results in the following objective:

$$\min_c \|1-c\|_2^2 \text{ s.t. } c_0 I_0 - c_{45}I_{45} + c_{90}I_{90} - c_{135}I_{135} =$$

$$0 \Rightarrow \min_c \|1-\|_2^2 \text{ s.t. } m^T c = 0$$

Using the Lagrange multiplier, the solution becomes:

$$L = \|1-c\|_2^2 + \lambda m^\top c$$

$$\frac{\partial L}{\partial c} = 0, \frac{\partial L}{\partial \lambda} = 0$$

The intensity correction manager 106 then solves for c for each pixel of the polarized images. Once solved, the intensity corrected images are the computed by multiplying the solved values of c by the pixels of each image. The intensity corrected images are then used by the polarized reflection manager 108 to compute new optimized alpha mattes that do not add additional noise.

Once the optimized (and, optionally, intensity corrected) alpha matte is generated, at numeral 5 it is provided to matte generator 110. In some embodiments, matte generator 110 inverts the optimized matte to produce an accurate matte of the subject. At numeral 7, the resulting output matte 120 is returned. In some embodiments, this technique is used to generate a matte dataset which includes an input image and corresponding matte. The matte dataset is usable for machine learning applications to train a machine learning model to predict an accurate output matte when given an arbitrary input image (e.g., individual images, collections of images, frames from a digital video, etc.) depicting a subject. Additionally, or alternatively, embodiments are used in place of green screen matting. In various embodiments, the above-described technique is used on still images of a subject, collections of images of the subject, frames of a video sequence, etc.

Although the above-described example determines an alpha value for the entire image, in some embodiments, different alpha values are determined for each channel of the images. For example, in some embodiments, a first alpha is determined for the red channel, a second alpha is determined for the green channel, and a third alpha is determined for the blue channel. Likewise, in some embodiments different alphas are generated for alternative color channels, depending on implementation. In some embodiments, all three color channels are combined, and the above techniques are applied in color space.

Figure 5:
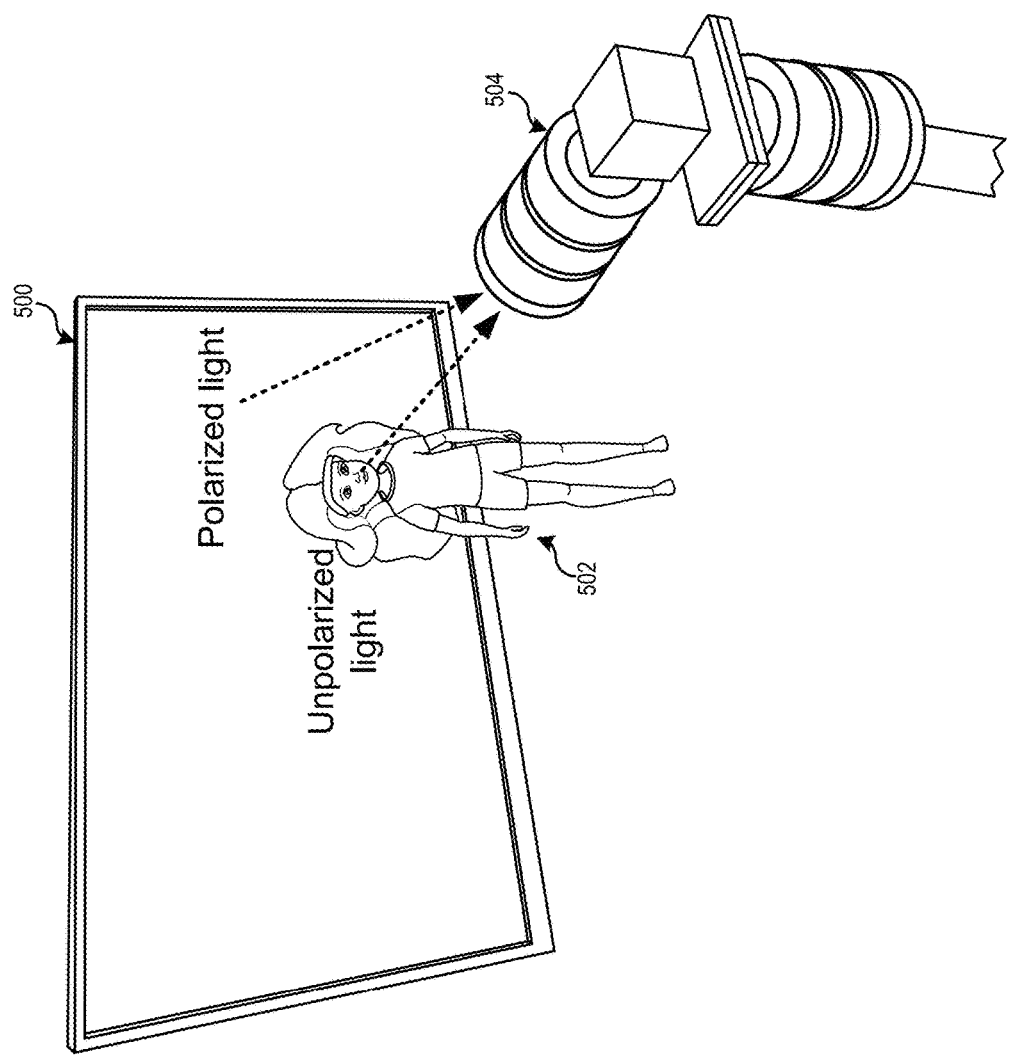
FIG. 5 illustrates an environment for capturing images of an object using polarized light in accordance with one or more embodiments.

FIG. 5 illustrates an environment for capturing images of an object using polarized light in accordance with one or more embodiments. As shown in FIG. 5, a polarized light source 500 is backlighting a subject 502. The subject 502 is captured by polarization camera 504. As shown, in some embodiments, the polarized light source is a screen. In some embodiments, alternative polarized lights sources are used. As a result of being backlit, the background of the polarized images includes polarized light, while the foreground of the polarized images includes unpolarized light (e.g., reflected from the foreground subject). Accordingly, the subject 502 has a roughly constant intensity regardless of the polarization angle of the polarization images, while the background varies in intensity in proportion to the polarization angle. Depending on the material of the subject, some of the reflected light is polarized and is received by the polarization camera from the subject. For example, if the subject includes any dielectric materials, or is otherwise not completely opaque (e.g., has a sheen or other shiny or translucent qualities), then the unpolarized light that is incident on the subject may polarize or partially polarize when it is reflected, resulting in the visual artifacts described above.

Figure 6:
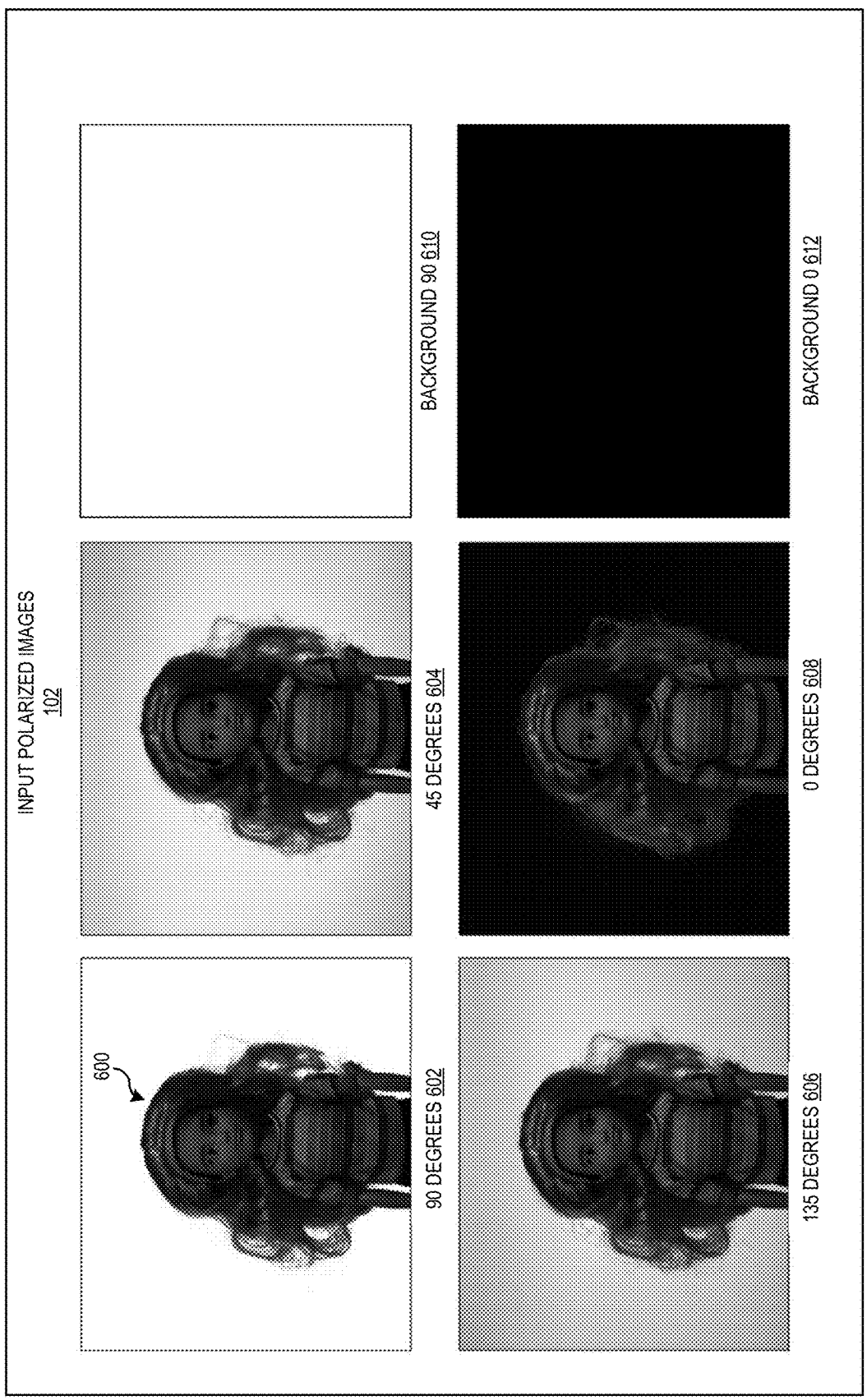
FIG. 6 illustrates an example of input polarized images in accordance with one or more embodiments.

FIG. 6 illustrates an example of input polarized images in accordance with one or more embodiments. As shown in FIG. 6, input polarized images 102 have been captured where a subject 600 is backlit by a polarized light source. In the example of FIG. 6, the polarized light source has a polarization angle of 90°. Accordingly, the 90° polarized image 602 has a bright background as all of the light passes through the 90° polarization filter of the image capture device. Likewise, the 0° polarized image 608 has a dark background, as the 90° polarized light cannot pass through the 0° (e.g., orthogonal) polarization filter. The remaining polarization images, 45° 604 and 135° 606, have a light background that is approximately half the intensity of the 90° image, as these polarization filters allow some light to pass through to the sensor. As shown, while the backgrounds vary in intensity, the foregrounds are approximately equal. As discussed, this is because the foreground reflects primarily unpolarized light, so any given polarization filter passes approximately the same amount of light (assuming the unpolarized light is not biased to any particular polarization). As discussed, the input polarized images 102 also include background images. The background images depict only the background, without any foreground subjects. As shown in FIG. 6, the background images include a 90° background image 610 and a 0° background image 612. In various embodiments, the input polarized images 102 include more or fewer background images having different polarization angles.

Figure 7:
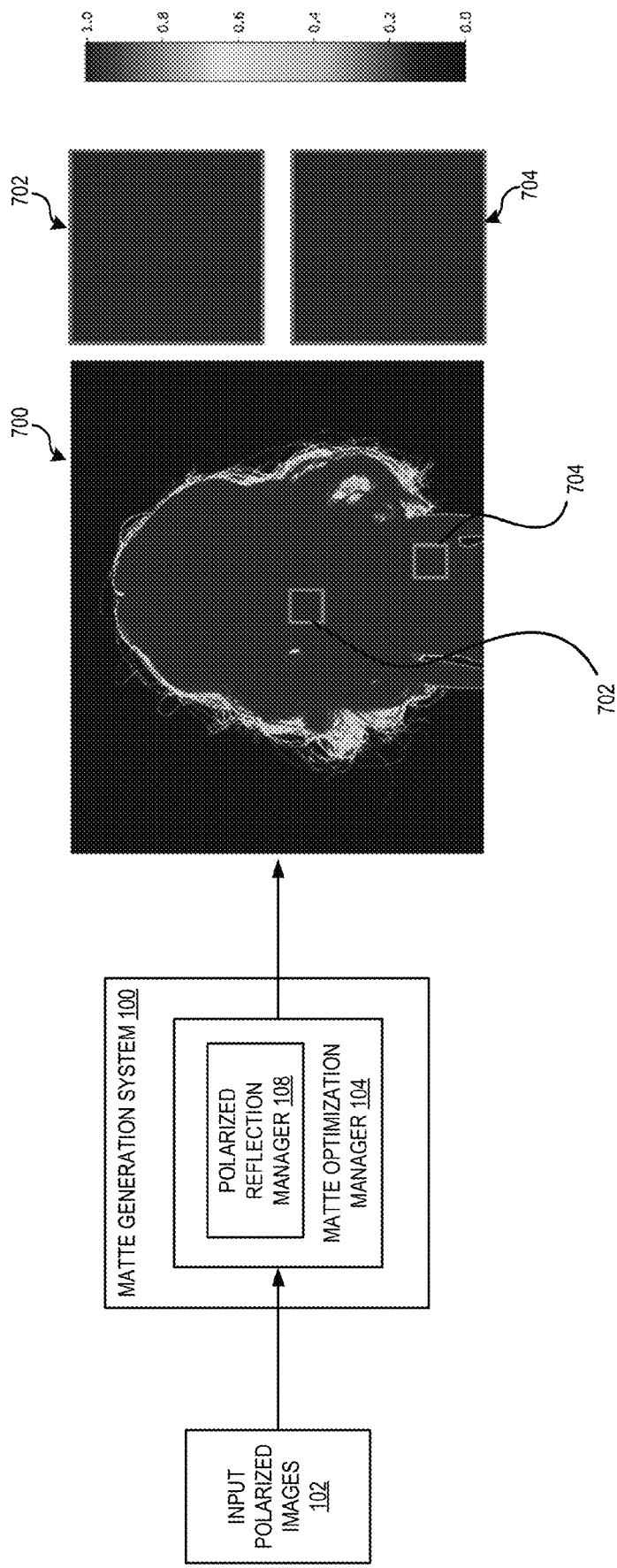
FIG. 7 illustrates a diagram of a process of generating an optimized matte by modeling polarized reflections, in accordance with one or more embodiments.

FIG. 7 illustrates a diagram of a process of generating an optimized matte by modeling polarized reflections, in accordance with one or more embodiments. In the example of FIG. 7, the matte optimization manager 104 has generated an optimized alpha matte represented by heat map 700. In this example, polarized reflection manager 108 has computed the optimized matte as described above, leveraging the 45° 604 and 135° 606 polarization images to model the polarized light reflected by the subject. The results are shown in area 702 and 704, which are now solid regions, having eliminated the polarized reflections that resulted in the artifacts shown in FIG. 2.

Figure 8:
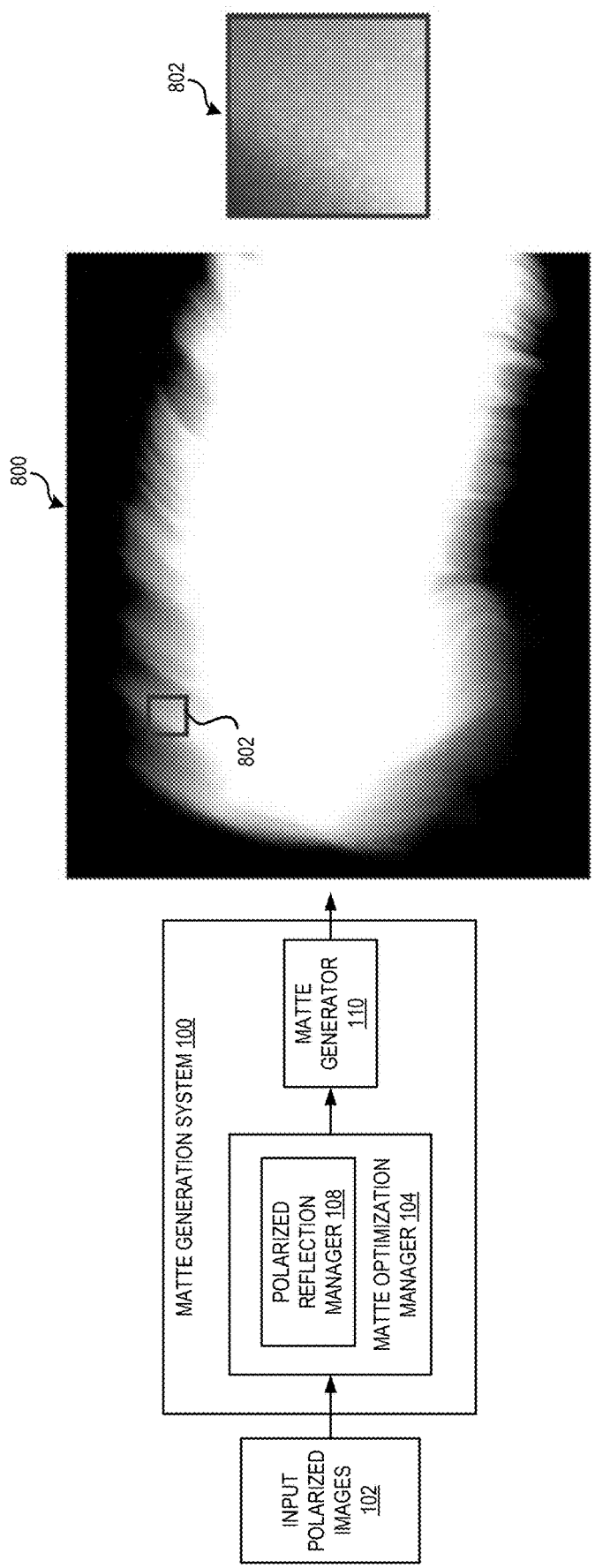
FIG. 8 illustrates an example of visual artifacts introduced by the process of generating an optimized matte by modeling polarized reflections, in accordance with one or more embodiments.

FIG. 8 illustrates an example of visual artifacts introduced by the process of generating an optimized matte by modeling polarized reflections, in accordance with one or more embodiments. As discussed, if the constraint $I_0+I_{90}=I_{45}+I_{135}$ is not true for a given set of input polarized images, noise is introduced to the output matte. This is shown in the example of FIG. 8 in output matte 800 which was generated from an optimized alpha matte without intensity correction. For example, areas of the matte associated with translucence (e.g., due to motion blur, subject material, etc.), become noisy, as shown in area 802. As discussed above, this is addressed via intensity correction manager, as discussed above.

Figure 9:
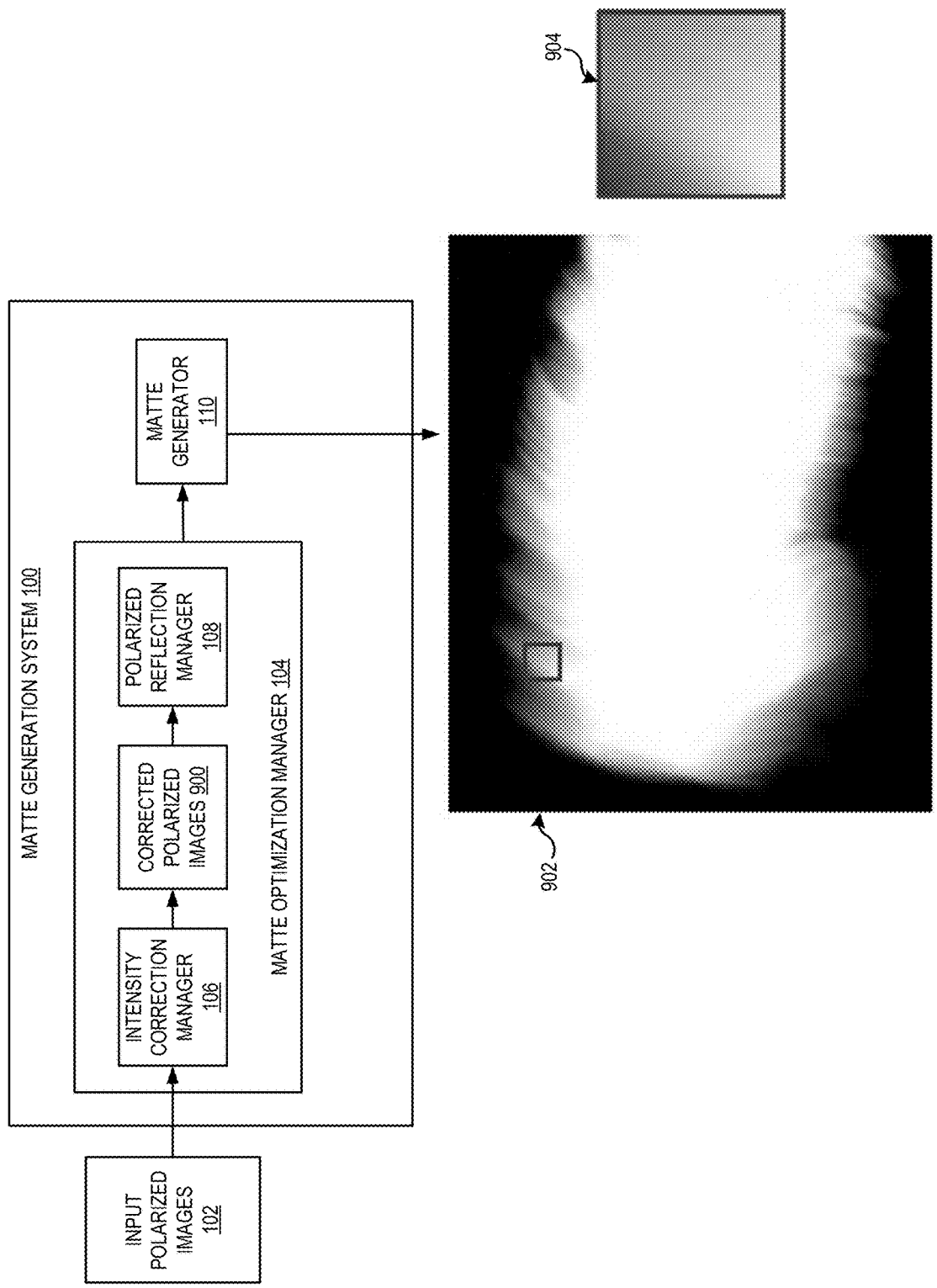
FIG. 9 illustrates a diagram of a process of generating an optimized matte by modeling polarized reflections and performing intensity correction, in accordance with one or more embodiments.

FIG. 9 illustrates a diagram of a process of generating an optimized matte by modeling polarized reflections and performing intensity correction, in accordance with one or more embodiments. As shown in FIG. 9, intensity correction manager 106 performs intensity correction on the input polarized images 102, as discussed above. The resulting corrected images 900 are then provided to polarized reflection manager 108 to generate the optimized alpha matte. By using the corrected images, output matte 902 is generated without the noise present in output matte 800 of FIG. 8, as shown in area 904.

Figure 10:
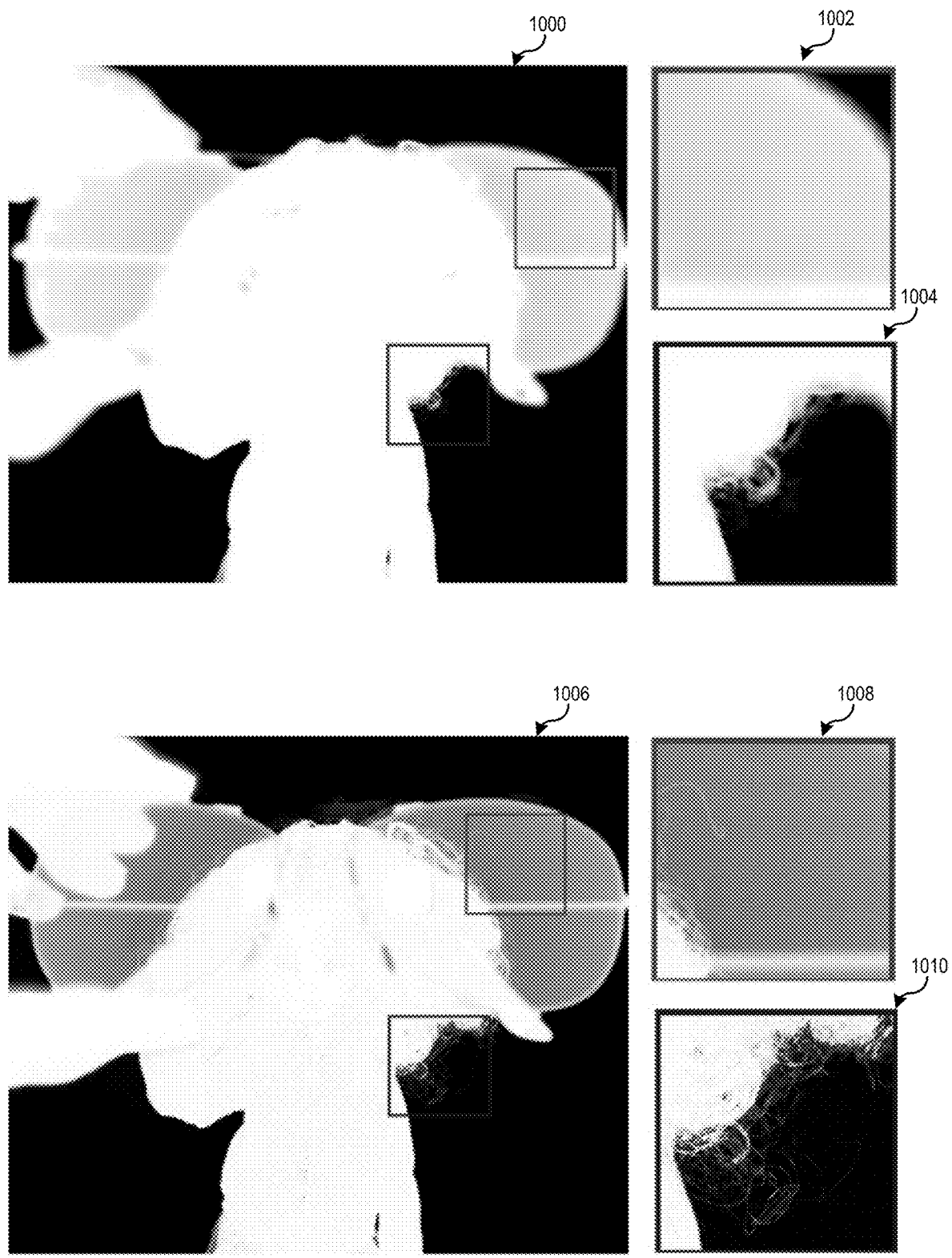

FIGS. 10-11 illustrate examples of comparisons of optimized mattes to mattes generated by prior matte generation techniques, in accordance with one or more embodiments. FIG. 10 shows an example of a matte 1000 generated for a stationary subject using traditional techniques and an example of a matte 1006 generated for the subject using an embodiment described herein. Matte 1000 has noticeably less detail of the subject captured. This is a result of fine detail being lost due to artifacts introduced through polarized reflections. For example, in area 1002, the region behind the glasses of the subject does not appear to include any detail. However, in area 1008 of matte 1006, the fine hairs of the subject behind the glasses are captured. Likewise, in area 1004, much of the fine details of the hair of the subject are lost when compared to area 1010.

FIG. 11 shows an example of a matte 1100 generated for a moving subject using traditional techniques and an example of a matte 1106 generated for the moving subject using an embodiment described herein. Much like the mattes in FIG. 10, matte 1100 has noticeably less detail of the subject captured when compared to matte 1106. For example, in area 1102, motion blurred area appears smeared, with the detail of the fibers of the duster lost. However, in area 1108 of matte 1106, the fine details are visible. Likewise, in area 1104, much of the fine details of the fibers of the duster are lost when compared to area 1110.

Figure 12:
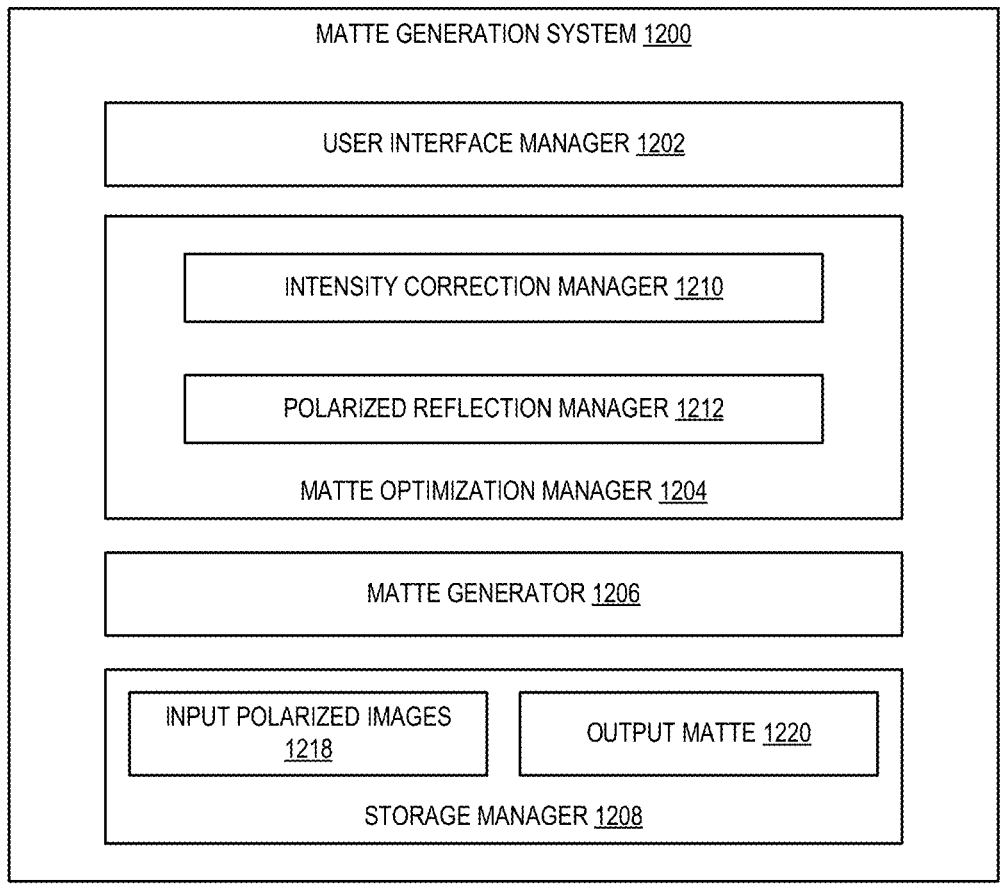
FIG. 12 illustrates a schematic diagram of a matte generation system in accordance with one or more embodiments.

FIG. 12 illustrates a schematic diagram of a matte generation system (e.g., "matte generation system" described above) in accordance with one or more embodiments. As shown, the matte generation system 1200 includes, but is not limited to, user interface manager 1202, matte optimization manager 1204, matte generator 1206, and storage manager 1208. The matte optimization manager 1204 includes an intensity correction manager 1210 and a polarized reflection manager 1212. The storage manager 1208 includes input polarized images 1218 and output matte(s) 1220.

As illustrated in FIG. 12, the matte generation system 1200 includes a user interface manager 1202. For example, the user interface manager 1202 allows users to provide input images to the matte generation system 1200. In some embodiments, the user interface manager 1202 provides a user interface through which the user uploads the images or initiates capture of the images from a polarization camera, beam splitter array, or combination thereof. Alternatively, or additionally, the user interface manager 1202 enables the user to select remotely stored polarized images, either by providing an address (e.g., a URL or other endpoint) associated with the remote images or connecting to a remote storage system (e.g., cloud storage, network storage, etc.) that includes the remote images. In some embodiments, the user interface enables a user to link an image capture device, such as a polarization camera or other hardware, to capture the polarization images and provide them to the matte generation system 1200. Additionally, the user interface manager 1202 allows users to request the matte generation system 1200 to generate a matte from the provided input polarized images.

As illustrated in FIG. 12, the matte generation system 1200 also includes matte optimization manager 1204. As discussed, matte optimization manager 1204 is responsible for generating an optimized alpha matte that models and removes polarized reflections from the subject of the input polarized images. For example, the input polarized images include multiple images depicting a subject. The subject is backlit by a polarized light source (e.g., a polarized screen, etc.) and the subject is placed in the foreground. Each polarized image has a different polarization angle. For example, in some embodiments, the polarized images include four polarized images: 0°, 45°, 90°, and 135° images. Although examples are described herein with respect to four polarized images, some embodiments are implemented using more images. Additionally, as discussed, the polarized images are captured using a polarization camera. This enables the four images with different polarization angles to be captured at once, which is particularly useful for capturing nonstationary objects. Alternatively, embodiments are implemented using beam splitters or a combination of beam splitters and polarization cameras.

The matte optimization manager includes a polarized reflection manager 1212. The polarized reflection manager models the polarized reflections as a quadratic optimization problem. Using intensity values of each of the polarized images, the polarized reflection manager solves the quadratic optimization problem to determine the alpha values that meet constraints imposed on the problem, as described above at least with respect to FIG. 1. This enables an optimized alpha matte to be generated in which the foreground subject as well as any polarized reflections from the subject are removed. As discussed, the constraints imposed on the polarized images do not always hold. In such instances, additional noise is introduced to the optimized matte. To account for this, the matte optimization manager 1204 also includes intensity correction manager 1210. Intensity correction is an optional step, performed on the input polarized images 1218 before they are processed by polarized reflection manager 1212. In some embodiments, the user chooses whether the matte generation system performs intensity correction via the user interface manager. Intensity correction manager 1210 determines a correction value to apply to the pixels of each image to ensure that the intensity constraint (e.g., $I_0 + I_{90} = I_{45} + I_{135}$, described above) holds. In doing so, the intensity correction manager 1210 determines constant values, c, for each image that, when multiplied by the pixels of their corresponding image, correct the image intensities to meet the constraint. The corrected polarized images are then used to determine the optimized matte by the polarized reflection manager 1212.

As illustrated in FIG. 12, the matte generation system 1200 also includes matte generator 1206. In some embodiments, the matte generator 1206 generates an output matte from the optimized alpha matte generated by matte optimization manager 1204. In some embodiments, the matte generator 1206 generates the output matte by inverting the alpha matte. Once the output matte has been produced, in some embodiments the output matte is added to a ground truth dataset for use in training a machine learning model to better predict more accurate mattes from input images, frames of digital videos, etc. Additionally, or alternatively, the mattes are used in place of green screen masking for adding effects to images, video, etc.

As illustrated in FIG. 12, the matte generation system 1200 also includes the storage manager 1208. The storage manager 1208 maintains data for the matte generation system 1200. The storage manager 1208 is operable to maintain data of any type, size, or kind as necessary to perform the functions of the matte generation system 1200.

The storage manager 1208, as shown in FIG. 12, includes the input polarized images 1218. The input polarized images 1218 include a plurality of digital images captured using a polarized image capture device (e.g., polarization camera, beam splitters, or combinations thereof), as discussed in additional detail above. In particular, in one or more embodiments, the input polarization images 1218 include digital images that depict a subject, backlit by a polarized light source, and digital images that only depict the background without a subject. Each input polarization image is associated with a different polarization angle. In some embodiments, as discussed, the input polarization images include four images 0°, 45°, 90°, and 135° images (e.g., including both subject polarization images and background polarization images of each polarization angle).

As further illustrated in FIG. 12, the storage manager 1208 also includes output matte data 1220. Output matte data 1220 includes a matte generated from the input images that has been optimized to remove artifacts introduced due to reflected polarized light from the subject. Optionally, the output matte is also optimized by performing intensity correction on the input polarized images to prevent any additional noise from being introduced during the optimization process, as discussed.

Each of the components 1202-1208 of the matte generation system 1200 and their corresponding elements (as shown in FIG. 12) are in communication with one another using any suitable communication technologies. It will be recognized that although components 1202-1208 and their corresponding elements are shown to be separate in FIG. 12, any of components 1202-1208 and their corresponding elements are combinable into fewer components, such as into a single facility or module, divided into more components, or configured into different components as serves a particular embodiment.

In various embodiments, the components 1202-1208 and their corresponding elements comprise software, hardware, or both. For example, in some embodiments, the components 1202-1208 and their corresponding elements comprise one or more instructions stored on a computer-readable storage medium and executable by processors of one or more computing devices. When executed by the one or more processors, the computer-executable instructions of the matte generation system 1200 cause a client device and/or a server device to perform the methods described herein. Alternatively, the components 1202-1208 and their corresponding elements comprise hardware, such as a special purpose processing device to perform a certain function or group of functions. Additionally, the components 1202-1208 and their corresponding elements comprise a combination of computer-executable instructions and hardware.

Furthermore, the components 1202-1208 of the matte generation system 1200 are, for example, implementable as one or more stand-alone applications, as one or more modules of an application, as one or more plug-ins, as one or more library functions or functions that are called by other applications, and/or as a cloud-computing model. Thus, in some embodiments, the components 1202-1208 of the matte generation system 1200 are implemented as a stand-alone application, such as a desktop or mobile application. Furthermore, in some embodiments, the components 1202-1208 of the matte generation system 1200 are implemented as one or more web-based applications hosted on a remote server. Alternatively, or additionally, the components of the matte generation system 1200 are implemented in a suite of mobile device applications or "apps." To illustrate, the components of the matte generation system 1200 are implemented as part of an application, or suite of applications, including but not limited to ADOBE CREATIVE CLOUD, ADOBE PHOTOSHOP, ADOBE ACROBAT, ADOBE ILLUSTRATOR, ADOBE LIGHTROOM and ADOBE INDESIGN. "ADOBE", "CREATIVE CLOUD," "PHOTOSHOP," "ACROBAT," "ILLUSTRATOR," "LIGHTROOM," and "INDESIGN" are either registered trademarks or trademarks of Adobe Inc. in the United States and/or other countries.

Figure 13:
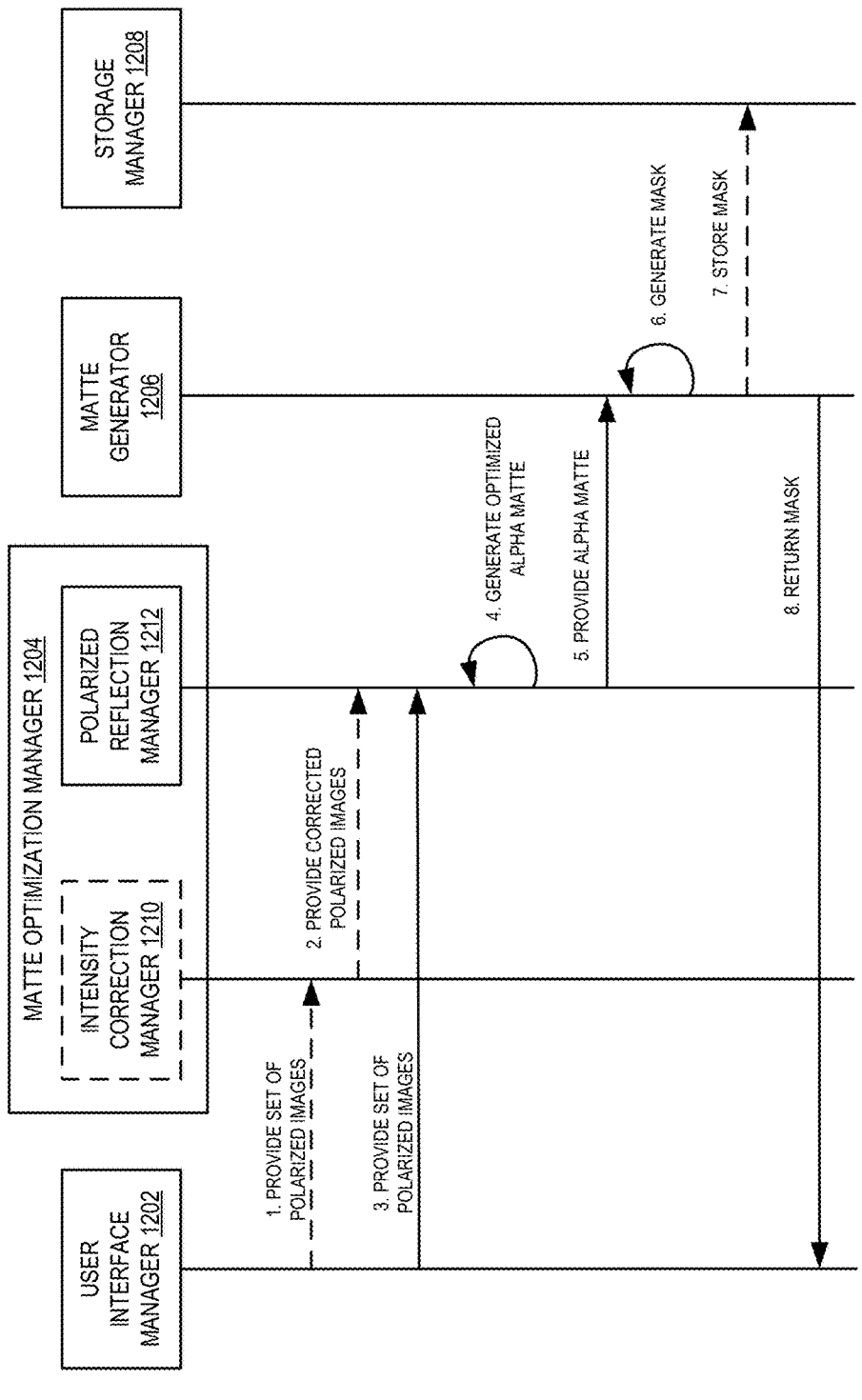
FIG. 13 illustrates a sequence diagram of a matte generation system in accordance with one or more embodiments.

FIG. 13 illustrates a sequence diagram 1300 of a matte generation system in accordance with one or more embodiments. As shown in FIG. 13, a user requests a mask to be generated from a set of polarized images via user interface manager 1202. The polarized images are retrieved from a storage location or from a polarization camera or other image capture device when the images are captured. For example, in some embodiments, a polarization camera is communicatively coupled (e.g., via a USB or other hardware or software interface) to the matte generation system. A command is sent from the user interface manager over a communication channel to the polarization camera and the set of polarization images is returned over the same or different communication channel.

Optionally, at numeral 1, a set of polarized images are provided to an intensity correction manager 1210 of matte optimization manager 1204 to perform intensity correction. As discussed, one constraint imposed on the set of polarized images is that the combined intensity of orthogonal polarized images is equal. This is not always true in practice and leads to noise in the generated matte when it is not true. Accordingly, the user is able to select whether to perform intensity correction and, if the intensity correction option is selected, then intensity correction is first performed. At numeral 2, the corrected polarized images are provided to polarized reflection manager 1212. Alternatively, if intensity correction is not selected, then the set of polarized images is provided directly to polarized reflection manager 1212, as shown at numeral 3.

At numeral 4, the polarized reflection manager 1212 generates an optimized alpha matte. As discussed, the intensities of the set of polarized images are used to model any polarized reflections from the subject in the images. This is formulated as a quadratic optimization problem in which alpha is a parameter to be solved for. The polarized reflection manager 1212 solves for alpha for each pixel and generates the optimized alpha matte. At numeral 5, the optimized alpha matte is provided to matte generator 1206. At numeral 6, the matte generator 1206 generates an output matte based on the alpha matte. For example, the matte generator inverts the values of the alpha matte to generate the output matte. Optionally, the resulting matte is stored at numeral 7. For example, in some embodiments, matte data, including the mattes and the set of polarized images, are stored as part of a training dataset to be used to train a machine learning model to predict accurate mattes for arbitrary input images, frames of digital videos, etc. At numeral 8, the resulting matte is returned to the user via the user interface manager 1202.

FIGS. 1-13, the corresponding text, and the examples, provide a number of different systems and devices that enable generation of optimized mattes based on polarized images. In addition to the foregoing, embodiments are also described in terms of flowcharts comprising acts and steps in a method for accomplishing a particular result. For example, FIG. 14 illustrates a flowchart of an exemplary method in accordance with one or more embodiments. The method described in relation to FIG. 14 is performable with fewer or more steps/acts or the steps/acts are performable in differing orders. Additionally, the steps/acts described herein are repeatable or performable in parallel with one another or in parallel with different instances of the same or similar steps/acts.

FIG. 14 illustrates a flowchart 1400 of a series of acts in a method of matte generation in accordance with one or more embodiments. In one or more embodiments, the method 1400 is performed in a digital medium environment that includes the matte generation system 1200. The method 1400 is intended to be illustrative of one or more methods in accordance with the present disclosure and is not intended to limit potential embodiments. Alternative embodiments include additional, fewer, or different steps than those articulated in FIG. 14.

As illustrated in FIG. 14, the method 1400 includes an act 1402 of obtaining, by a user interface manager, a set of polarized input images, the set of polarized images including background images depicting a background and subject images depicting a foreground object in front of the background and backlit by a polarized light source, the set of polarized input images including more than two polarized images, each associated with a different polarization angle. As discussed, in some embodiments the set of polarized input images is received from a polarization camera which is operable to capture multiple polarized images at once. In such instances, obtaining the set of polarized images further includes causing a polarization camera to capture the set of polarized input images and receiving the set of polarized input images from the polarization camera. For example, the polarization camera is communicatively coupled to the matte generation system via the user interface manager. A command is sent to the polarization camera to capture the images. Alternatively, the images are captured using other polarizing image capture devices, such as beam splitters, or a combination of beam splitters and polarization cameras. In some embodiments, the set of polarized images are retrieved from a local or remote data storage location. In some embodiments, the set of polarized input images are part of a sequence of frames that comprise a digital video.

In some embodiments, the more than two polarized images include 0-, 45-, 90-, and 135-degree polarized images. In some embodiments, the method further includes performing, by the matte optimization manager, intensity correction on the set of polarized input images such that a sum of intensities of the 0-degree polarized image and the 90-degree polarized image is equal to a sum of intensities of the 45-degree polarized image and the 135-degree polarized image. In some embodiments, performing intensity correction further includes determining a minimum correction value for each of the polarized input images and applying the minimum correction value to its corresponding polarized input image to generate a set of corrected polarized input images.

As illustrated in FIG. 14, the method 1400 includes an act 1404 of determining, by a matte optimization manager, an at least partially polarized reflection on the foreground object based on the set of polarized input images. For example, as discussed, the polarized reflections from the subject of the images are determined by modeling the reflections based on the intensity of the images.

As illustrated in FIG. 14, the method 1400 includes an act 1406 of determining, by the matte optimization manager, an alpha matte based at least on intensity values associated with each of the set of polarized input images such that the alpha matte isolates the foreground object and removes the at least partially polarized reflection. In some embodiments, determining the alpha matte includes determining an optimum alpha value such that a foreground polarized reflection intensity is less than a foreground unpolarized reflection intensity, a combined intensity of orthogonal pairs of the polarized input images are equal, and a polarized reflection intensity of the polarized input image that is orthogonal to the polarized light source is equal to zero. In some embodiments, determining the optimum alpha value includes determining the optimum alpha value for each color channel of the set of polarized input images. For example, the alpha value is one parameter in a system of equations based on the intensity of the polarized images that is solved as a quadratic optimization problem. In some embodiments, the optimum alpha value is determined using a quadratic optimization library.

As illustrated in FIG. 14, the method 1400 includes an act 1408 of generating, by a matte generator, an output matte based on the alpha matte. For example, in some embodiments, the alpha matte values are inverted to generate the output matte. In some embodiments, once the output matte has been generated, the output matte and the set of polarized input images are added to a training dataset to be used to train a machine learning model to predict mattes (e.g., for input images, collections of images, frames of a digital video, etc.).

Figure 15:
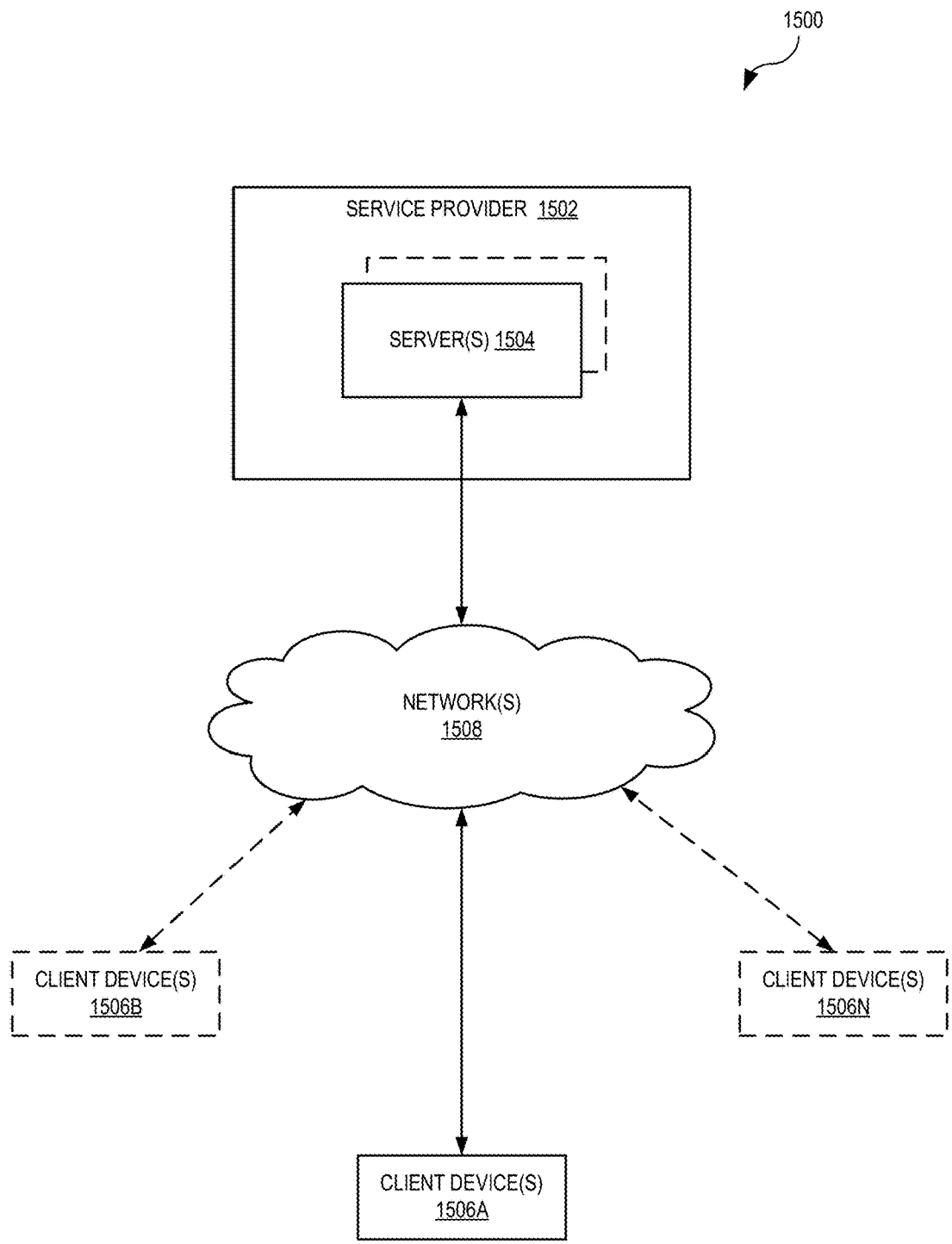
FIG. 15 illustrates a schematic diagram of an exemplary environment in which the image processing system operates in accordance with one or more embodiments.

FIG. 15 illustrates a schematic diagram of an exemplary environment 1500 in which the matte generation system 1200 operates in accordance with one or more embodiments. In one or more embodiments, the environment 1500 includes a service provider 1502 which includes one or more servers 1504 connected to a plurality of client devices 1506A-1506N via one or more networks 1508. The client devices 1506A-1506N, the one or more networks 1508, the service provider 1502, and the one or more servers 1504 communicate with each other or other components using any communication platforms and technologies suitable for transporting data and/or communication signals, including any known communication technologies, devices, media, and protocols supportive of remote data communications, examples of which will be described in more detail below with respect to FIG. 16.

Although FIG. 15 illustrates a particular arrangement of the client devices 1506A-1506N, the one or more networks 1508, the service provider 1502, and the one or more servers 1504, various additional arrangements are possible. For example, the client devices 1506A-1506N directly communicate with the one or more servers 1504, bypassing the network 1508. Or alternatively, the client devices 1506A-1506N directly communicate with each other. In some embodiments, the service provider 1502 is a public cloud service provider which owns and operates their own infrastructure in one or more data centers and provides this infrastructure to customers and end users on demand to host applications on the one or more servers 1504. The servers, in some embodiments, include one or more hardware servers (e.g., hosts), each with its own computing resources (e.g., processors, memory, disk space, networking bandwidth, etc.) which are securely divided between multiple customers, each of which host their own applications on the one or more servers 1504. In some embodiments, the service provider includes a private cloud provider which maintains cloud infrastructure for a single organization. In some embodiments, the one or more servers 1504 similarly include one or more hardware servers, each with its own computing resources, which are divided among applications hosted by the one or more servers for use by members of the organization or their customers.

Similarly, although the environment 1500 of FIG. 15 is depicted as having various components, the environment 1500 includes additional or alternative components. For example, the environment 1500 is implementable on a single computing device with the matte generation system 1200. In particular, the matte generation system 1200 is implementable in whole or in part on the client device 1502A.

As illustrated in FIG. 15, the environment 1500 includes client devices 1506A-1506N. The client devices 1506A-1506N comprise any computing device. For example, client devices 1506A-1506N comprise one or more personal computers, laptop computers, mobile devices, mobile phones, tablets, special purpose computers, TVs, or other computing devices, including computing devices described below with regard to FIG. 16. Although three client devices are shown in FIG. 15, it will be appreciated that client devices 1506A-1506N comprise any number of client devices (greater or smaller than shown).

Moreover, as illustrated in FIG. 15, the client devices 1506A-1506N and the one or more servers 1504 communicate via one or more networks 1508. The one or more networks 1508 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1508 include any suitable network over which the client devices 1506A-1506N access service provider 1502 and server 1504, or vice versa. The one or more networks 1508 will be discussed in more detail below with regard to FIG. 16.

In addition, the environment 1500 also includes one or more servers 1504. The one or more servers 1504 generate, store, receive, and transmit any type of data, including input polarized images 1218, output matte data 1220, or other information. For example, a server 1504 receives data from a client device, such as the client device 1506A, and send the data to another client device, such as the client device 1502B and/or 1502N. The server 1504 also transmits electronic messages between one or more users of the environment 1500. In one example embodiment, the server 1504 is a data server. The server 1504 also comprises a communication server or a web-hosting server. Additional details regarding the server 1504 will be discussed below with respect to FIG. 16.

As mentioned, in one or more embodiments, the one or more servers 1504 include or implement at least a portion of the matte generation system 1200. In particular, the matte generation system 1200 comprises an application running on the one or more servers 1504 or a portion of the matte generation system 1200 is downloaded from the one or more servers 1504. For example, in some embodiments, the matte generation system 1200 includes a web hosting application that allows the client devices 1506A-1506N to interact with content hosted at the one or more servers 1504. To illustrate, in one or more embodiments of the environment 1500, one or more client devices 1506A-1506N access a webpage supported by the one or more servers 1504. In particular, the client device 1506A runs a web application (e.g., a web browser) to allow a user to access, view, and/or interact with a webpage or web site hosted at the one or more servers 1504.

Upon the client device 1506A accessing a webpage or other web application hosted at the one or more servers 1504, in one or more embodiments, the one or more servers 1504 provide access to one or more digital images (e.g., the input polarized images 1218) stored at the one or more servers 1504. Moreover, the client device 1506A receives a request (i.e., via user input) to generate a matte based on the input polarized images and provides the request to the one or more servers 1504. Upon receiving the request, the one or more servers 1504 automatically perform the methods and processes described above to generate a matte. The one or more servers 1504 provide the resulting matte to the client device 1506A for display to the user.

As just described, the matte generation system 1200 is implementable in whole, or in part, by the individual elements 1502-1508 of the environment 1500. It will be appreciated that although certain components of the matte generation system 1200 are described in the previous examples with regard to particular elements of the environment 1500, various alternative implementations are possible. For instance, in one or more embodiments, the matte generation system 1200 is implemented on any of the client devices 1506A-N. Similarly, in one or more embodiments, the matte generation system 1200 is implementable on the one or more servers 1504. Moreover, different components and functions of the matte generation system 1200 is implementable separately among client devices 1506A-1506N, the one or more servers 1504, and the network 1508.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implementable at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media include any available media that are accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are usable to store desired program code means in the form of computer-executable instructions or data structures and which are accessible by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media include a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure is implementable in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure is also implementable in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Embodiments of the present disclosure are implementable in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model includes various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model is also deployable using different deployment models such as private cloud, community cloud, public cloud, hybrid cloud, and so forth. In this description and in the claims, a "cloud-computing environment" is an environment in which cloud computing is employed.

Figure 16:
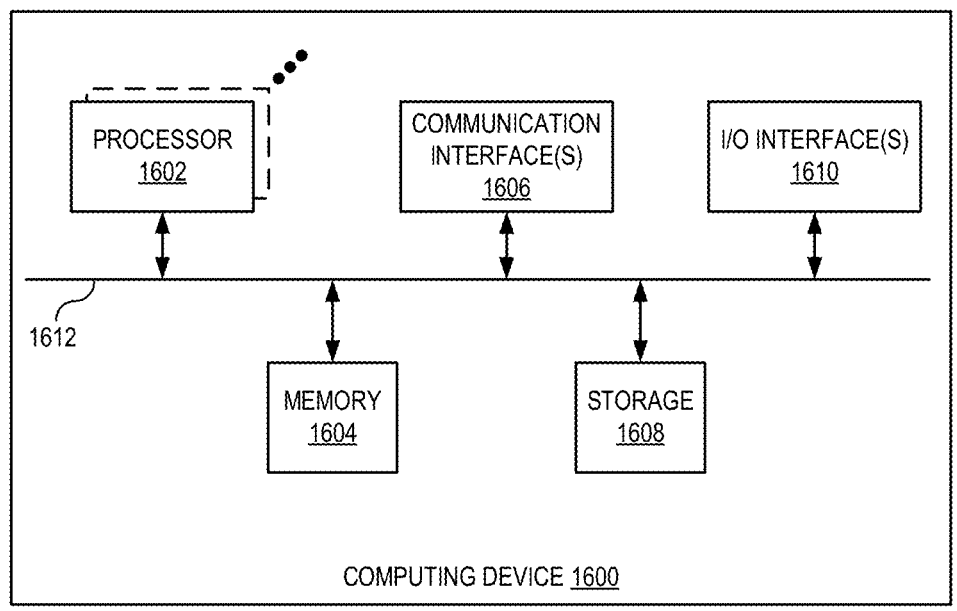
FIG. 16 illustrates a block diagram of an exemplary computing device in accordance with one or more embodiments.

FIG. 16 illustrates, in block diagram form, an exemplary computing device 1600 that is configured to perform one or more of the processes described above. One will appreciate that one or more computing devices such as the computing device 1600 implement the matte generation system. As shown by FIG. 16, the computing device comprises a processor 1602, memory 1604, one or more communication interfaces 1606, a storage device 1608, and one or more I/O devices/interfaces 1610. In certain embodiments, the computing device 1600 includes fewer or more components than those shown in FIG. 16. Components of computing device 1600 shown in FIG. 16 will now be described in additional detail.

In particular embodiments, processor(s) 1602 includes hardware for executing instructions, such as those making up a computer program. As an example, and not by way of limitation, to execute instructions, processor(s) 1602 retrieve (or fetch) the instructions from an internal register, an internal cache, memory 1604, or a storage device 1608 and decode and execute them. In various embodiments, the processor(s) 1602 include one or more central processing units (CPUs), graphics processing units (GPUs), field programmable gate arrays (FPGAs), systems on chip (SoC), or other processor(s) or combinations of processors.

The computing device 1600 includes memory 1604, which is coupled to the processor(s) 1602. The memory 1604 is used for storing data, metadata, and programs for execution by the processor(s). The memory 1604 includes one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1604 includes internal or distributed memory.

The computing device 1600, in some embodiments, further includes one or more communication interfaces 1606. A communication interface 1606 includes hardware, software, or both. The communication interface 1606 provides one or more interfaces for communication (such as, for example, packet-based communication) between the computing device and one or more other computing devices 1600 or one or more networks. As an example and not by way of limitation, communication interface 1606 includes a network interface controller (NIC) or network adapter for communicating with an Ethernet or other wire-based network or a wireless NIC (WNIC) or wireless adapter for communicating with a wireless network, such as a WI-FI. The computing device 1600 further includes a bus 1612. The bus 1612 comprises hardware, software, or both that couples components of computing device 1600 to each other.

The computing device 1600 includes a storage device 1608 includes storage for storing data or instructions. As an example, and not by way of limitation, storage device 1608 comprises a non-transitory storage medium described above.

The storage device 1608 includes a hard disk drive (HDD), flash memory, a Universal Serial Bus (USB) drive or a combination these or other storage devices. The computing device 1600 also includes one or more input or output ("I/O") devices/interfaces 1610, which are provided to allow a user to provide input to (such as user strokes), receive output from, and otherwise transfer data to and from the computing device 1600. These I/O devices/interfaces 1610 include, in some embodiments, a mouse, keypad or a keyboard, a touch screen, camera, optical scanner, network interface, modem, other known I/O devices or a combination of such I/O devices/interfaces 1610. The touch screen is activatable with a stylus or a finger.

The I/O devices/interfaces 1610 includes one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1610 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments include other specific forms without departing from its spirit or essential characteristics. The described embodiments are to be considered in all respects only as illustrative and not restrictive. For example, the methods described herein are performable with fewer or more steps/acts or the steps/acts are performable in differing orders. Additionally, the steps/acts described herein are repeatable or performable in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
    obtaining, by a user interface manager, a set of polarized input images, the set of polarized images including background images depicting a background and subject images depicting a foreground object in front of the background and backlit by a polarized light source, the set of polarized input images including at least four polarized images, each associated with a different polarization angle;
    performing, by a matte optimization manager, intensity correction on the set of polarized input images such that a sum of intensities of a first polarized image and a second polarized image is equal to a sum of intensities of a third polarized image and a fourth polarized image;
    determining, by the matte optimization manager, an at least partially polarized reflection on the foreground object based on the set of polarized input images;
    determining, by the matte optimization manager, an alpha matte based at least on intensity values associated with each of the set of polarized input images such that the alpha matte isolates the foreground object and removes the at least partially polarized reflection; and
    generating, by a matte generator, an output matte based on the alpha matte.

2. The computer-implemented method of claim 1, wherein obtaining, by a user interface manager, a set of polarized input images depicting a foreground object backlit by a polarized light source, the set of polarized input images including more than two polarized images, each associated with a different polarization angle, further comprises:
    causing a polarization camera to capture the set of polarized input images; and
    receiving the set of polarized input images from the polarization camera.

3. The computer-implemented method of claim 1, wherein the at least four polarized images include 0-, 45-, 90-, and 135-degree polarized images.

4. The computer-implemented method of claim 3, wherein performing, by the matte optimization manager, intensity correction on the set of polarized input images such that a sum of intensities of a first polarized image and a second polarized image is equal to a sum of intensities of a third polarized image and a fourth polarized image, further comprises:
    performing, by the matte optimization manager, intensity correction on the set of polarized input images such that a sum of intensities of the 0-degree polarized image and the 90-degree polarized image is equal to a sum of intensities of the 45-degree polarized image and the 135-degree polarized image.

5. The computer-implemented method of claim 4, wherein performing intensity correction on the set of polarized inputs such that a sum of intensities of the 0-degree polarized image and the 90-degree polarized image is equal to a sum of intensities of the 45-degree polarized image and the 135-degree polarized image, further comprises:
    determining a minimum correction value for each of the polarized input images; and
    applying the minimum correction value to its corresponding polarized input image to generate a set of corrected polarized input images.

6. The computer-implemented method of claim 1, wherein determining, by the matte optimization manager, an alpha matte based at least on intensity values associated with each of the set of polarized input images such that the alpha matte isolates the foreground object and removes the at least partially polarized reflection, further comprises:
    determining an optimum alpha value such that a foreground polarized reflection intensity is less than a foreground unpolarized reflection intensity, a combined intensity of orthogonal pairs of the polarized input images are equal, and a polarized reflection intensity of the polarized input image that is orthogonal to the polarized light source is equal to zero.

7. The computer-implemented method of claim 6, wherein determining an optimum alpha value such that a foreground polarized reflection intensity is less than a foreground unpolarized reflection intensity, a combined intensity of orthogonal pairs of the polarized input images are equal, and a polarized reflection intensity of the polarized input image that is orthogonal to the polarized light source is equal to zero, further comprises:

determining the optimum alpha value for each color channel of the set of polarized input images.

8. The computer-implemented method of claim 6, wherein the optimum alpha value is determined using a quadratic optimization library.

9. The computer-implemented method of claim 1, further comprising:

adding the output matte and the set of polarized input images to a training dataset to be used to train a machine learning model to predict mattes.

10. The computer-implemented method of claim 1, wherein set of polarized input images are part of a sequence of frames that comprise a digital video.

11. A matte generation system, comprising:

a user interface manager to obtain a set of polarized input images, the set of polarized images including background images depicting a background and subject images depicting a foreground object in front of the background and backlit by a polarized light source, the set of polarized input images including at least four polarized images, each associated with a different polarization angle;

a matte optimization manager to:

perform intensity correction on the set of polarized input images such that a sum of intensities of a first polarized image and a second polarized image is equal to a sum of intensities of a third polarized image and a fourth polarized image;

determine an at least partially polarized reflection on the foreground object based on the set of polarized input images; and determine an alpha matte based at least on intensity values associated with each of the set of polarized input images such that the alpha matte isolates the foreground object and removes the at least partially polarized reflection; and a matte generator to generate an output matte based on the alpha matte.

12. The system of claim 11, wherein to obtain a set of polarized input images depicting a foreground object backlit by a polarized light source, the set of polarized input images including more than two polarized images, each associated with a different polarization angle, the user interface manager is further to:

cause a polarization camera to capture the set of polarized input images; and receive the set of polarized input images from the polarization camera.

13. The system of claim 11, wherein the at least four polarized images include 0-, 45-, 90-, and 135-degree polarized images.

14. The system of claim 13, wherein to perform intensity correction on the set of polarized input images such that a sum of intensities of a first polarized image and a second polarized image is equal to a sum of intensities of a third polarized image and a fourth polarized image, the matte optimization manager is further to:

perform intensity correction on the set of polarized input images such that a sum of intensities of the 0-degree polarized image and the 90-degree polarized image is equal to a sum of intensities of the 45-degree polarized image and the 135-degree polarized image.

15. The system of claim 14, wherein to perform intensity correction on the set of polarized inputs such that a sum of intensities of the 0-degree polarized image and the 90-degree polarized image is equal to a sum of intensities of the 45-degree polarized image and the 135-degree polarized image, the matte optimization manager is further to:

determine a minimum correction value for each of the polarized input images; and apply the minimum correction value to its corresponding polarized input image to generate a set of corrected polarized input images.

16. The system of claim 11, wherein to determine an alpha matte based at least on intensity values associated with each of the set of polarized input images such that the alpha matte isolates the foreground object and removes the at least partially polarized reflection, the matte optimization manager is further to:

determine an optimum alpha value such that a foreground polarized reflection intensity is less than a foreground unpolarized reflection intensity, a combined intensity of orthogonal pairs of the polarized input images are equal, and a polarized reflection intensity of the polarized input image that is orthogonal to the polarized light source is equal to zero.

17. The system of claim 16, wherein to determine an optimum alpha value such that a foreground polarized reflection intensity is less than a foreground unpolarized reflection intensity, a combined intensity of orthogonal pairs of the polarized input images are equal, and a polarized reflection intensity of the polarized input image that is orthogonal to the polarized light source is equal to zero, the matte optimization manager is further to:

determine the optimum alpha value for each color channel of the set of polarized input images.

18. A system, comprising:

means for obtaining a set of polarized input images, the set of polarized images including background images depicting a background and subject images depicting a foreground object in front of the background and backlit by a polarized light source, the set of polarized input images including at least four polarized images, each associated with a different polarization angle;

means for performing intensity correction on the set of polarized input images such that a sum of intensities of a first polarized image and a second polarized image is equal to a sum of intensities of a third polarized image and a fourth polarized image;

means for determining an at least partially polarized reflection on the foreground object based on the set of polarized input images;

means for determining an alpha matte based at least on intensity values associated with each of the set of polarized input images such that the alpha matte isolates the foreground object and removes the at least partially polarized reflection; and means for generating an output matte based on the alpha matte.

19. The system of claim 18, wherein the means for obtaining a set of polarized input images depicting a foreground object backlit by a polarized light source, the set of polarized input images including more than two polarized images, each associated with a different polarization angle, further comprises:

means for causing a polarization camera to capture the set of polarized input images; and means for receiving the set of polarized input images from the polarization camera.

20. The system of claim 18, wherein the more than two at least four polarized images include 0-, 45-, 90-, and 135-degree polarized images.

* * * * *